(12) United States Patent
Sawada

(10) Patent No.: US 8,807,640 B2
(45) Date of Patent: Aug. 19, 2014

(54) ROOF APPARATUS

(71) Applicant: Aisin Seiki Kabushiki Kaisha, Kariya (JP)

(72) Inventor: Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 13/890,295

(22) Filed: May 9, 2013

(65) Prior Publication Data
US 2013/0307295 A1 Nov. 21, 2013

(30) Foreign Application Priority Data
May 17, 2012 (JP) .................................. 2012-113397

(51) Int. Cl.
*B60J 10/12* (2006.01)
*B60J 7/043* (2006.01)

(52) U.S. Cl.
CPC ............... *B60J 10/12* (2013.01); *B60J 7/0435* (2013.01)
USPC ............ 296/216.06; 296/216.05; 296/220.01; 296/216.03

(58) Field of Classification Search
CPC ........... B60J 10/12; B60J 7/043; B60J 7/0435
USPC ........................................... 296/216.01–224
See application file for complete search history.

(56) References Cited

U.S. PATENT DOCUMENTS

| 4,995,665 | A | * | 2/1991 | Ichinose et al. ................ 296/213 |
| 8,333,427 | B2 | | 12/2012 | Sawada |
| 8,388,053 | B2 | * | 3/2013 | Kikuchi et al. ............... 296/223 |
| 2007/0228779 | A1 | | 10/2007 | Stallfort |
| 2010/0084893 | A1 | | 4/2010 | Faerber |
| 2012/0112498 | A1 | * | 5/2012 | Kikuchi et al. ............... 296/221 |

FOREIGN PATENT DOCUMENTS

EP 2 078 630 B1 7/2009

OTHER PUBLICATIONS

K. Sawada, "Roof Apparatus," U.S. Appl. No. 13/888,404, filed May 7, 2013.

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A roof apparatus includes a weather strip arranged at a position where a frontward link member and a rearward link member slide thereon at a position outward of either a first edge portion of a front panel or a second edge portion of a rear panel in a state where the front panel makes a sliding movement. Each of the frontward link member and the rearward link member includes a frontward guide surface and a rearward guide surface generating a component of force that makes the weather strip to resiliently deform upwardly, the frontward guide surface and the rearward guide surface arranged at end surfaces of the frontward guide surface and the rearward guide surface, the end surfaces that come into contact with the weather strip first in a state where the frontward link member and the rearward link member move in a frontward-rearward direction together with the front panel.

6 Claims, 10 Drawing Sheets

ROOF APPARATUS

CROSS REFERENCE TO RELATED APPLICATIONS

This application is based on and claims priority under 35 U.S.C. §119 to Japanese Patent Application 2012-113397, filed on May 17, 2012, the entire content of which is incorporated herein by reference.

TECHNICAL FIELD

This disclosure generally relates to a roof apparatus.

BACKGROUND DISCUSSION

A roof apparatus including a front panel positioned at a frontward area of an opening formed on a roof portion of a vehicle and a rear panel positioned at a rearward area of the opening is known. A roof apparatus disclosed in US2010/0084893A1, hereinafter referred to as Reference 1, is an example of such roof apparatus. As FIGS. 11A and 11B illustrate, the roof apparatus disclosed in Reference 1 includes a front panel 102 that opens and closes a frontward area of an opening 101 that is formed on a roof portion 100 of a vehicle, a rear panel 103 that covers a rearward area of the opening 101, and a guide rail 104 that is arranged at an end portion in a vehicle width direction of the opening 101 and extends in a frontward-rearward direction of the vehicle, where the frontward-rearward direction of the vehicle refers to a direction perpendicular to the surface where the FIGS. 11A and 11B are drawn. Furthermore, a link member 105, which is linked to an end portion in the vehicle width direction of the front panel 102, is slidably connected to the guide rail 104.

In the roof apparatus, the link member 105 makes movements including a sliding movement to bring the front panel 102, for example, to a state known as a pop-up state, which is a state where the front panel 102 is raised in an upward direction relative to the roof portion 100 and the rear panel 103. Furthermore, in the roof apparatus, the link member 105 makes movements including a sliding movement to, for example, slide the front panel 102 in a rearward direction of the vehicle while retaining the front panel 102 in the pop-up state to open the frontward area of the opening 101. At the time of opening the frontward area of the opening 101, the front panel 102, which is in the pop-up state, moves to a position above the rear panel 103.

Upon the arrangement described herewith, the link member 105, which is linked to the end portion in the vehicle width direction of the front panel 102, projects above the roof portion 100 and the rear panel 103 through a clearance formed between an edge portion 103a of the rear panel 103, the edge portion 103a that is in a vehicle width direction, and an edge portion 101a of the opening 101 that is formed in a flange form. Accordingly, a clearance width A2 of a clearance C102 is defined larger than a clearance width A1 of a clearance C101. The clearance C102 is the clearance formed between the edge portion 101a of the opening 101 and the edge portion 103a of the rear panel 103, the edge portion 103a that is in a vehicle width direction. The clearance C101 is the clearance formed between the edge portion 101a of the opening 101 and an edge portion 102a of the front panel 102, the edge portion 102a that is in the vehicle width direction, where the front panel 102 is in a fully closed state.

Note that a first weather strip 106 having a substantially D-shape cross section is attached to the edge portion 101a of the opening 101 such that the first weather strip 106 makes liquid tight contact with the edge portion 102a of the front panel 102, the edge portion 102a that is in the vehicle width direction, in a state where the front panel 102 is in the fully closed state. Furthermore, a second weather strip 107 having a substantially D-shape cross section is attached to the edge portion 103a of the rear panel 103, the edge portion 103a that is in a vehicle width direction, such that the second weather strip 107 makes liquid tight contact with the first weather strip 106. In other words, the second weather strip 107 is provided for closing an additional clearance of the clearance width A2 relative to the clearance width A1 in order to prevent entry, for example, of water drops or rain drops through the additional clearance.

The link member 105, which is linked to the end portion in the vehicle width direction of the front panel 102, basically projects above the roof portion 100 by resiliently deforming the second weather strip 107. Furthermore, the link member 105 slides on the second weather strip 107 by resiliently deforming the second weather strip 107 in a state where the front panel 102 makes a sliding movement.

In a state where the roof portion 100 in a state where the front panel 102 is in the fully closed state is viewed from an upward direction, which is from a direction that looks at a design surface, a portion where the edge portion 102a of the front panel 102 and the edge portion 103a of the rear panel 103 abut is out of alignment in the vehicle width direction due to a positional difference of the edge portion 102a and the edge portion 103a in the vehicle width direction, where the edge portion 102a and the edge portion 103a refer to the edge portions that are in the vehicle width direction. In other words, an alignment of the edge portion 102a of the front panel 102 and the edge portion 103a of the rear panel 103 is off in the vehicle width direction by an amount of the second weather strip 107, where the edge portion 102a and the edge portion 103a refer to the edge portions that are in the vehicle width direction. Accordingly, resulting appearance at boundaries of the edge portion 102a and the edge portion 103a becomes less pleasing because the boundaries of the edge portion 102a and the edge portion 103a do not form a substantially straight line in the frontward-rearward direction of the vehicle.

Accordingly, a favorable configuration of a roof apparatus includes a weather strip having a substantially equal cross sectional shape throughout the weather strip, the weather strip that is retained on a guide rail or a similar retaining member arranged, for example, at a roof portion, the weather strip that makes liquid tight contact with an edge portion of a roof opening and with each of an edge portion of a front panel and an edge portion of a rear panel, the edge portions that are in the vehicle width direction. Upon the arrangement described herewith, the boundaries of the edge portion of the front panel and the edge portion of the rear panel may form a substantially straight line in the frontward-rearward direction of the vehicle. Accordingly, the resulting appearance at the boundaries may be enhanced.

Each of weather strips in such configuration is required to make liquid tight contact with an edge portion in the vehicle width direction of a rear panel at a rearward area of a roof opening, for example, in a state where a front panel is in a fully closed state. Furthermore, each of the weather strips in such configuration is required to resiliently deform smoothly as a link member that is projecting above the roof portion slides thereon in a state where the front panel makes a sliding movement. A smooth resilient deformation of the weather strip is required for restraining a weather strip from receiving an excessive load from the sliding movement of the front panel and from repeating unstable resilient deformations that may cause duration of life of the weather strip to lessen. Accordingly, a favorable configuration of a weather strip resiliently deforms smoothly as the link member that is projecting above the surface of the roof portion slides on the weather strip in a state where the front panel makes the sliding movement.

For similar reasons, each of the weather strips in such configuration is required to resiliently deform smoothly in a case where the front panel that has been raised upward descends in a direction of the roof opening to close the roof opening and makes liquid tight contact with an edge portion of the front panel, the edge portion that is in the vehicle width direction.

A need thus exists for a roof apparatus, which is not susceptible to the drawback mentioned above.

SUMMARY

A roof apparatus includes a front panel configured to open and close a frontward area of an opening that is formed on a roof portion of a vehicle and a rear panel covering a rearward area of the opening. The roof apparatus further includes a first end portion made of resin formed at a peripheral portion of the front panel and a second end portion made of resin formed at a peripheral portion of the rear panel, the first end portion and the second end portion configured to align edges of the first end portion and the second end portion, the edges that are in a vehicle width direction, the edges that are viewed from a direction that looks at a design surface of the roof portion of the vehicle. The roof apparatus furthermore includes a frontward link member connected to a frontward portion of an end area in the vehicle width direction of the front panel and a rearward link member connected to a rearward portion of an end area in the vehicle width direction of the front panel, the frontward link member and the rearward link member configured to move the front panel in an upward-downward direction relative to the opening and configured to provide the front panel with a sliding movement while retaining the front panel in a state where the front panel is raised in the upward direction. The roof apparatus further includes a weather strip making a liquid tight contact with a first edge portion of the front panel, the first edge portion that is in the vehicle width direction, where the front panel is in a fully closed state, the weather strip making a liquid tight contact with a second edge portion of the rear panel, the second edge portion that is in the vehicle width direction, the weather strip arranged at a position where the frontward link member and the rearward link member slide thereon at a position that is outward of either the first edge portion of the front panel or the second edge portion of the rear panel in a state where the front panel is in a sliding movement. Each of the frontward link member and the rearward link member includes a frontward guide surface and a rearward guide surface generating a component of force that makes the weather strip to resiliently deform upwardly, the frontward guide surface and the rearward guide surface arranged at end surfaces of the frontward link member and the rearward link member, the end surfaces that come into contact with the weather strip first in a state where the frontward link member and the rearward link member make a movement in a frontward-rearward direction, the movement that accompanies a movement of the front panel.

A roof apparatus includes a front panel configured to open and close a frontward area of an opening that is formed on a roof portion of a vehicle and a rear panel covering a rearward area of the opening. The roof apparatus further includes a first end portion made of resin formed at a peripheral portion of the front panel and a second end portion made of resin formed at a peripheral portion of the rear panel, the first end portion and the second end portion configured to align edges of the first end portion and the second end portion, the edges that are in a vehicle width direction, the edges that are viewed from a direction that looks at a design surface of the roof portion of the vehicle. The roof apparatus furthermore includes a frontward link member connected to a frontward portion of an end area in the vehicle width direction of the front panel and a rearward link member connected to a rearward portion of an end area in the vehicle width direction of the front panel, the frontward link member and the rearward link member configured to move the front panel in an upward-downward direction relative to the opening and configured to provide the front panel with a sliding movement while retaining the front panel in a state where the front panel is raised in the upward direction. The roof apparatus further includes a weather strip making a liquid tight contact with a first edge portion of the front panel, the first edge portion that is in the vehicle width direction, where the front panel is in a fully closed state, the weather strip making a liquid tight contact with a second edge portion of the rear panel, the second edge portion that is in the vehicle width direction, the weather strip arranged at a position where the frontward link member and the rearward link member slide thereon at a position that is outward of either the first edge portion of the front panel or the second edge portion of the rear panel in a state where the front panel is in a sliding movement. The first end portion includes a first flange portion that extends downwardly in a vehicle height direction while slanting inwardly in the vehicle width direction. The second end portion includes a second flange portion that extends downwardly in the vehicle height direction while slanting outwardly in the vehicle width direction.

A roof apparatus includes a front panel configured to open and close a frontward area of an opening that is formed on a roof portion of a vehicle and a rear panel covering a rearward area of the opening. The roof apparatus further includes a first end portion made of resin formed at a peripheral portion of the front panel and a second end portion made of resin formed at a peripheral portion of the rear panel, the first end portion and the second end portion configured to align edges of the first end portion and the second end portion, the edges that are in a vehicle width direction, the edges that are viewed from a direction that looks at a design surface of the roof portion of the vehicle. The roof apparatus furthermore includes a frontward link member connected to a frontward portion of an end area in the vehicle width direction of the front panel and a rearward link member connected to a rearward portion of an end area in the vehicle width direction of the front panel, the frontward link member and the rearward link member configured to move the front panel in an upward-downward direction relative to the opening and configured to provide the front panel with a sliding movement while retaining the front panel in a state where the front panel is raised in the upward direction. The roof apparatus further includes a weather strip making a liquid tight contact with a first edge portion of the front panel, the first edge portion that is in the vehicle width direction, where the front panel is in a fully closed state, the weather strip making a liquid tight contact with a second edge portion of the rear panel, the second edge portion that is in the vehicle width direction, the weather strip arranged at a position where the frontward link member and the rearward link member slide thereon at a position that is outward of either the first edge portion of the front panel or the second edge portion of the rear panel in a state where the front panel is in a sliding movement. Each of the frontward link member and the rearward link member includes a frontward guide surface and a rearward guide surface generating a component of force that makes the weather strip to resiliently deform upwardly, the frontward guide surface and the rearward guide surface arranged at end surfaces of the frontward link member and the rearward link member, the end surfaces that come into contact with the weather strip first in a state where the frontward link member and the rearward link member make a movement in a frontward-rearward direction, the movement that accompanies a movement of the front panel. The first end portion includes a first flange portion that extends downwardly in a vehicle height direction while slanting inwardly in the vehicle width direction. The second end portion includes a second flange portion that extends downwardly in the vehicle height direction while slanting outwardly in the vehicle width direction.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A roof apparatus according to an embodiment will be described referring to FIGS. 1 to 10. Note that a frontward-rearward direction refers to a frontward-rearward direction of a vehicle and an upward direction and a downward direction refers to an upward direction in a vehicle height direction and a downward direction in the vehicle height direction, respectively. Furthermore, a vehicle interior direction refers to a direction in a vehicle width direction toward vehicle interior and a vehicle exterior direction refers to a direction in the vehicle width direction toward vehicle exterior.

Figure 1:
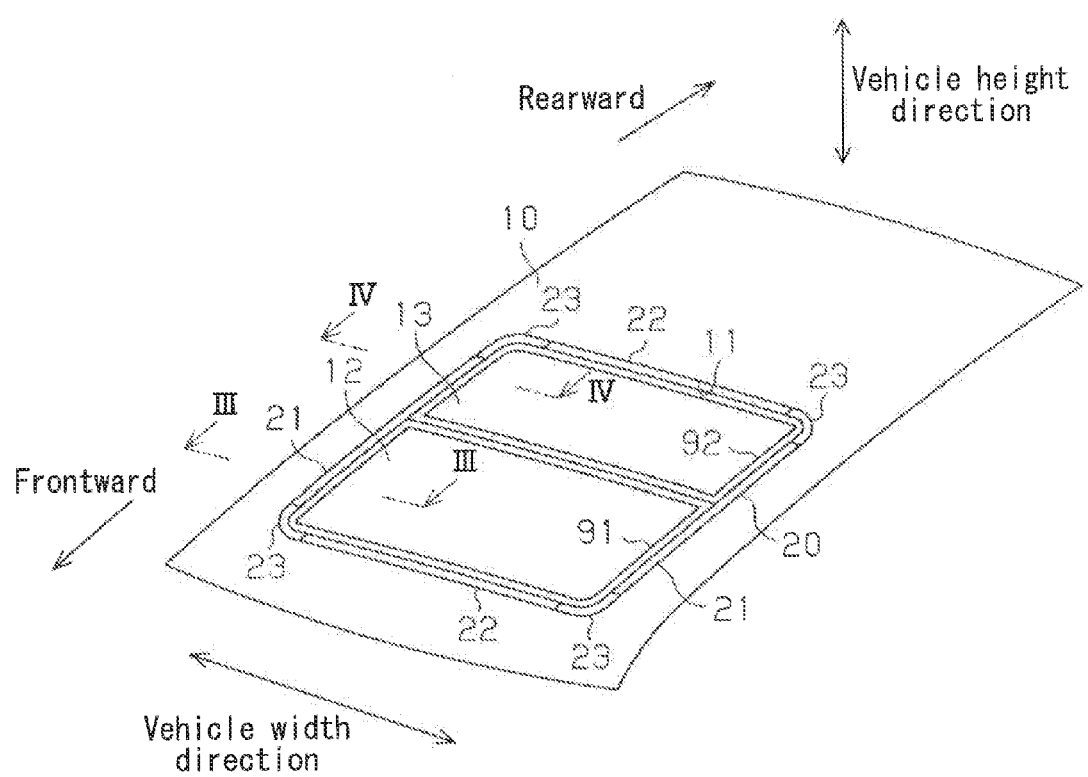
FIG. 1 is a perspective view drawing illustrating an embodiment of a roof apparatus according to this disclosure where the roof apparatus is in a closed state.
Figure 2:
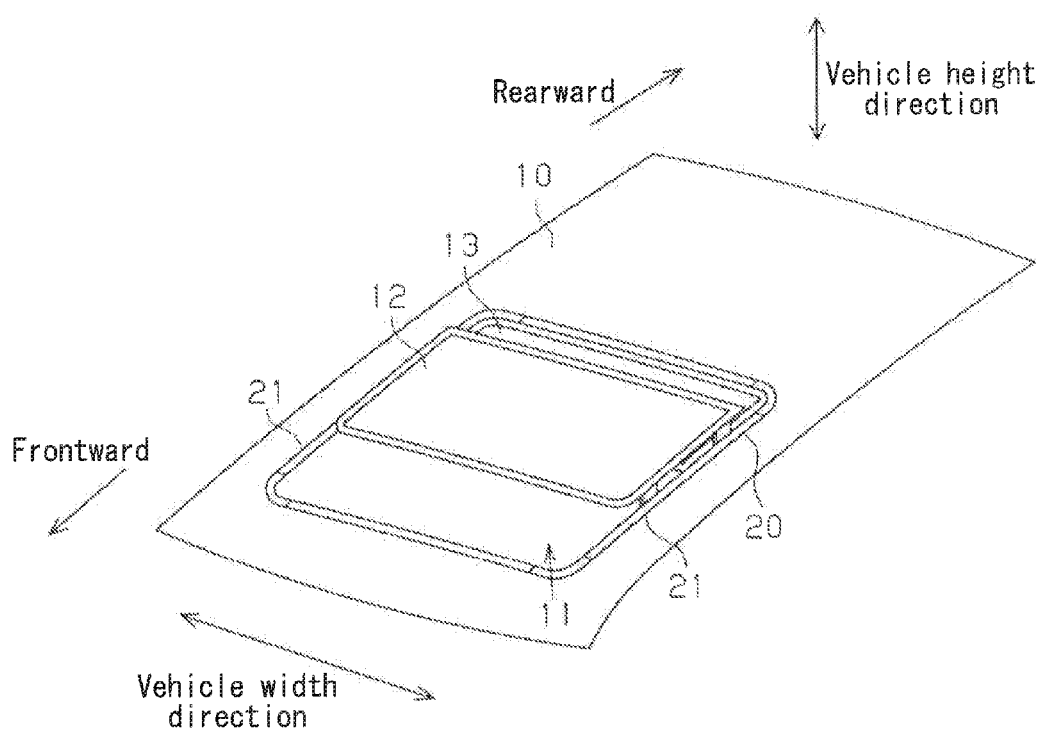
FIG. 2 is perspective view drawing illustrating the embodiment of the roof apparatus where the roof apparatus is in an open state.

As FIGS. 1 and 2 illustrate, a roof 10 includes a roof opening 11. The roof 10 serves as a roof portion of a vehicle, where a vehicle refers, for example, to an automobile. The roof opening 11 serves as an opening. The roof opening 11 is formed in a form similar to a quadrilateral. A front panel 12 that is formed in a form similar to a quadrilateral and a rear panel 13 that is formed in a form similar to a quadrilateral are arranged at the roof opening 11. Each of the front panel 12 and the rear panel 13 is made of, for example, glass that is formed in a plate form. The front panel 12 that attaches to the roof opening 11 is configured to open and close a frontward area of the roof opening 11. More specifically, the front panel 12 that attaches to the roof opening 11 is configured to make a tilt-up movement, a pop-up movement, and a sliding movement. The tilt-up movement refers to a movement of the front panel 12 where a rearward portion of the front panel 12 ascends with a frontward portion of the front panel 12 as a pivoting point. The pop-up movement refers to a movement of the front panel 12 where each of a frontward portion and a rearward portion of the front panel 12 ascends. The sliding movement refers to a movement of the front panel 12 where the front panel 12 slides in the frontward-rearward direction. In a state where the front panel 12 opens or closes the frontward portion of the roof opening 11, the front panel 12 makes the sliding movement in a style that is known as an outer sliding style, where the front panel 12 makes the sliding movement while the front panel 12 is retained in the pop-up state. On the other hand, the rear panel 13 is attached to the roof opening 11 to cover a rearward area of the roof opening 11 at all times.

Furthermore, the roof 10 is provided with a seal member 20 formed by resin or a similar material. The seal member 20 is formed in a substantially quadrilateral ring form and arranged along a peripheral portion of the roof opening 11. The seal member 20 includes a pair of side portion weather strips 21, each of which serves as a weather strip. The side portion weather strips 21 extend in the frontward-rearward direction along the portions in the vehicle width direction of the peripheral portion of the roof opening 11. The seal member 20 includes a pair of frontward-rearward portion weather strips 22. The frontward-rearward portion weather strips 22 extend in the vehicle width direction to connect the frontward portions of the side portion weather strips 21 and the rearward portions of the side portion weather strips 21 with a die formed corner member 23 provided between each of the side portion weather strips 21 and each of the frontward-rearward portion weather strips 22. Each of the side portion weather strips 21 is provided with a uniform cross sectional shape throughout each of the side portion weather strips 21 in the frontward-rearward direction. Each of the frontward-rearward portion weather strips 22 is provided with a uniform cross sectional shape throughout each of the frontward-rearward portion weather strips 22 in the vehicle width direction. Each of the side portion weather strips 21 and each of the frontward-rearward portion weather strips 22 makes liquid tight contact with an edge portion 11a of the roof opening 11.

Furthermore, the front panel 12 is provided with an end portion 91, which serves as a first end portion, along a peripheral portion of the front panel 12. The end portion 91 is formed by a resin material and formed in a substantially quadrilateral ring form. The rear panel 13 is provided with an end portion 92, which serves as a second end portion, along a peripheral portion of the rear panel 13. The end portion 92 is formed by a resin material and formed in a substantially quadrilateral ring form. The end portion 91 makes liquid tight contact with a frontward portion of each of the side portion weather strips 21 and the frontward-rearward portion weather strip 22 that is provided at a position in the frontward direction. The end portion 92 makes liquid tight contact with a rearward portion of each of the side portion weather strips 21 and the frontward-rearward portion weather strip 22 that is provided at a position in the rearward direction. Accordingly, the peripheral portion of the roof opening 11 is entirely sealed in a state where the front panel 12 is in a fully closed state.

In a state where the seal member 20 is viewed from the upward direction, which is from the direction that looks at a design surface, each of the side portion weather strips 21 of the seal member 20 extends in a substantially straight line for an entire span of the roof opening 11 in the frontward-rearward direction including at a portion where the front panel 12 and the rear panel 13 abut. Furthermore, in a state where the end portion 91 of the front panel 12 is viewed from the upward direction, the end portion 91, which makes contact with each of the side portion weather strips 21 in a state where the front panel 12 is in a fully closed state, aligns with the end portion 92 of the rear panel 13 in a substantially straight line, the end portion 92 that likewise makes contact with each of the side portion weather strips 21. In other words, the end portion 91 of the front panel 12 and the end portion 92 of the rear panel 13 are arranged such that positions in the vehicle width direction of the end portion 91 and the end portion 92 align.

A structure configured to open and close the front panel 12 will be described next. The structure is basically symmetric in the vehicle width direction. In other words, the structure to the right operates similarly to the structure to the left. Accordingly, the structure on one side in the vehicle width direction will be described hereinafter.

Figure 3:
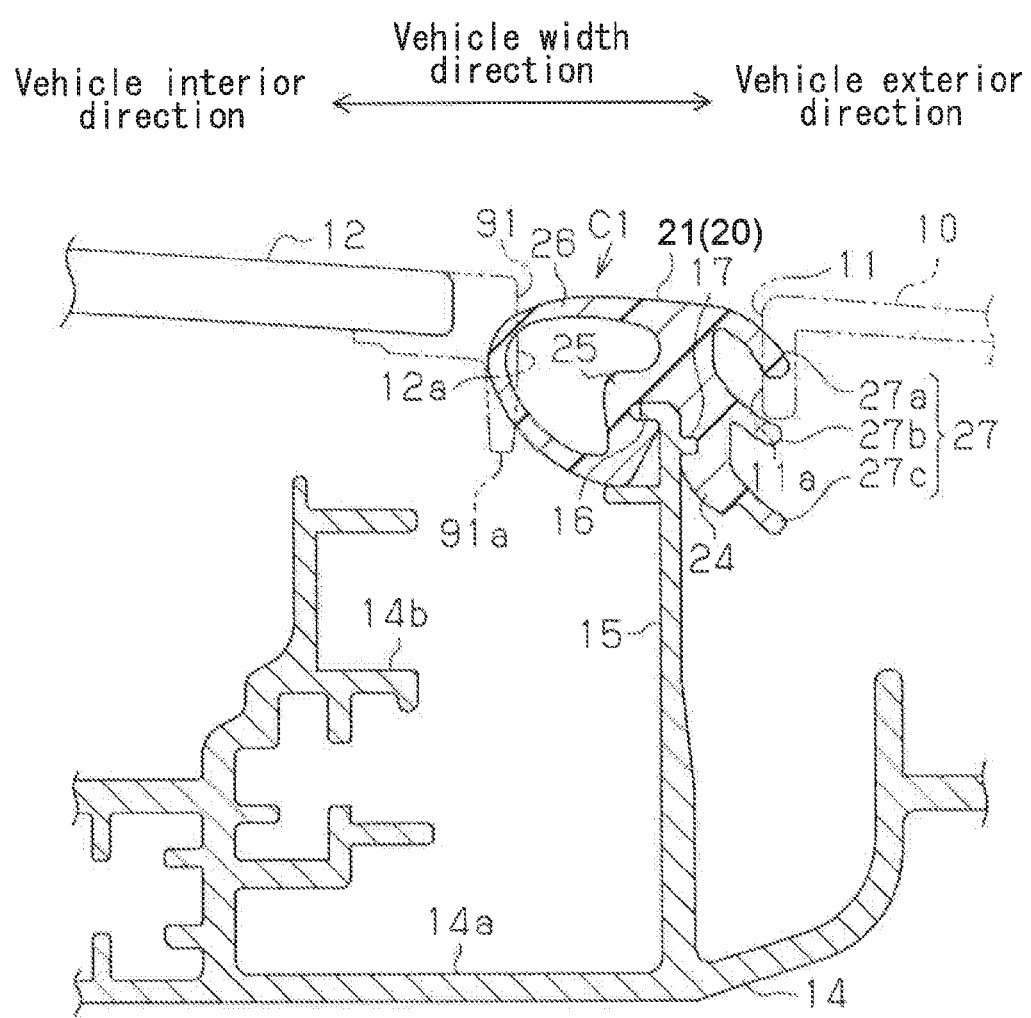
FIG. 3 is a cross-sectional view of the embodiment of the roof apparatus taken along line III-III in FIG. 1.
Figure 4:
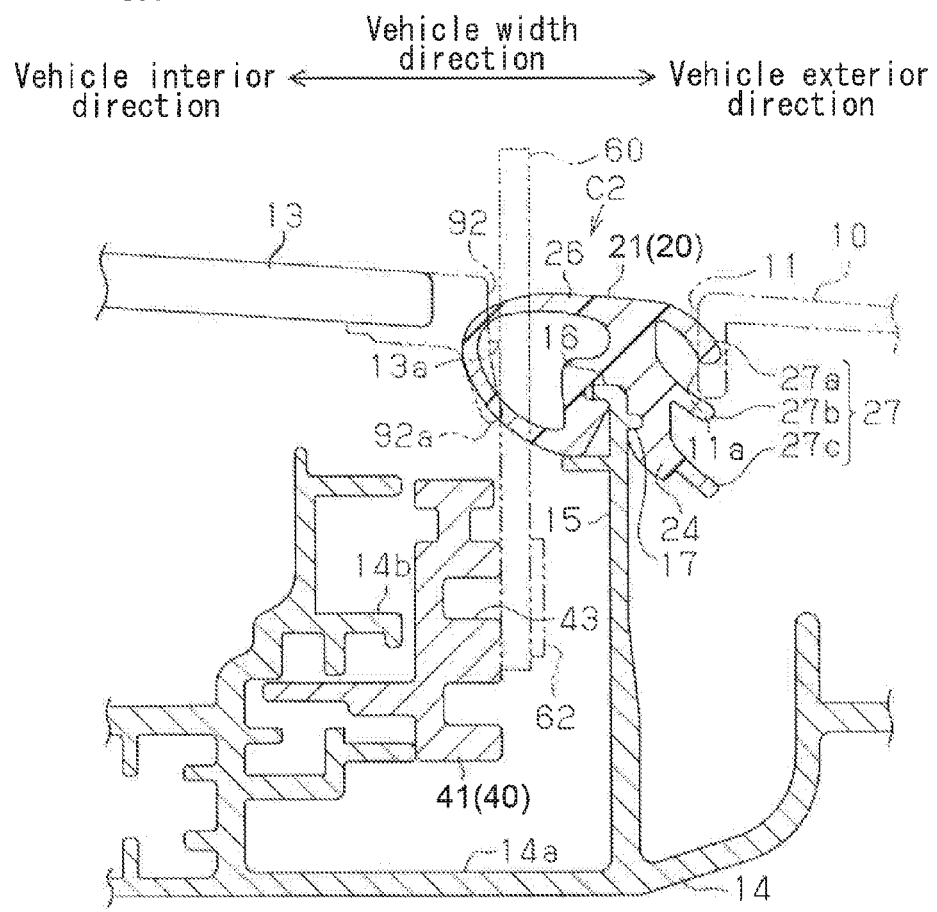
FIG. 4 is a cross-sectional view of the embodiment of the roof apparatus taken along line IV-IV in FIG. 1.

As FIGS. 3 and 4 illustrate, a guide rail 14 is provided at each of end portions of the roof 10, the end portions that are in the vehicle width direction. The guide rail 14 is formed by extrusion of aluminum alloy or formed by a similar method using a similar material. The guide rail 14 extends in the frontward-rearward direction at a portion in the downward direction relative to the roof opening 11, where the frontward-rearward direction refers to a direction perpendicular to the surface where FIG. 3 is drawn. The guide rail 14 includes a bottom wall 14a having an elongated form that extends in the frontward-rearward direction and a vertical wall portion 15 that extends in the upward direction from the bottom wall 14a. The end portion 91 of the front panel 12 includes a first flange portion 91a that extends downwardly. The first flange portion 91a is slightly slanted toward the vehicle interior direction as the first flange portion 91a extends in the downward direction. The end portion 92 of the rear panel 13 includes a second flange portion 92a that extends downwardly. The second flange portion 92a is slanted toward the vehicle exterior direction as the second flange portion 92a extends in the downward direction.

Furthermore, the vertical wall portion 15 is arranged at a position within a clearance C1, the position that is in the vehicle width direction. The clearance C1 is formed between an edge portion 11a of the roof opening 11, the edge portion 11a that extends downwardly in a flange form, and an edge portion 12a at the end portion 91 of the front panel 12, the edge portion 12a that is in the vehicle width direction, where the front panel 12 is in a fully closed state. Furthermore, the vertical wall portion 15 is arranged at a position within a clearance C2, the position that is in the vehicle width direction. The clearance C2 is formed between the edge portion 11a of the roof opening 11 and an edge portion 13a at the end portion 92 of the rear panel 13, the edge portion 13a that is in the vehicle width direction. Note that the edge portion 12a of the front panel 12, the edge portion 12a that is in the vehicle width direction, and the edge portion 13a of the rear panel 13, the edge portion 13a that is in the vehicle width direction, are arranged such that positions in the vehicle width direction of the edge portion 12a and the edge portion 13a align.

The guide rail 14 includes a first locking portion 16 formed in a flange form that protrudes in the vehicle interior direction from a top end of the vertical wall portion 15. The guide rail 14 furthermore includes a second locking portion 17 formed in a flange form that protrudes in the vehicle exterior direction from the vertical wall portion 15 at a position in a downward direction relative to the first locking portion 16. The side portion weather strip 21 is fitted at a top portion of the vertical wall portion 15. Note that the guide rail 14 includes a rail portion 14b at a position in the upward direction relative to the bottom wall 14a and in the vehicle interior direction relative to each of the clearance C1 and the clearance C2. The rail portion 14b is formed to have a cross sectional shape similar to a U-shape, the U shape having an open end in a vehicle exterior direction.

Figure 7:
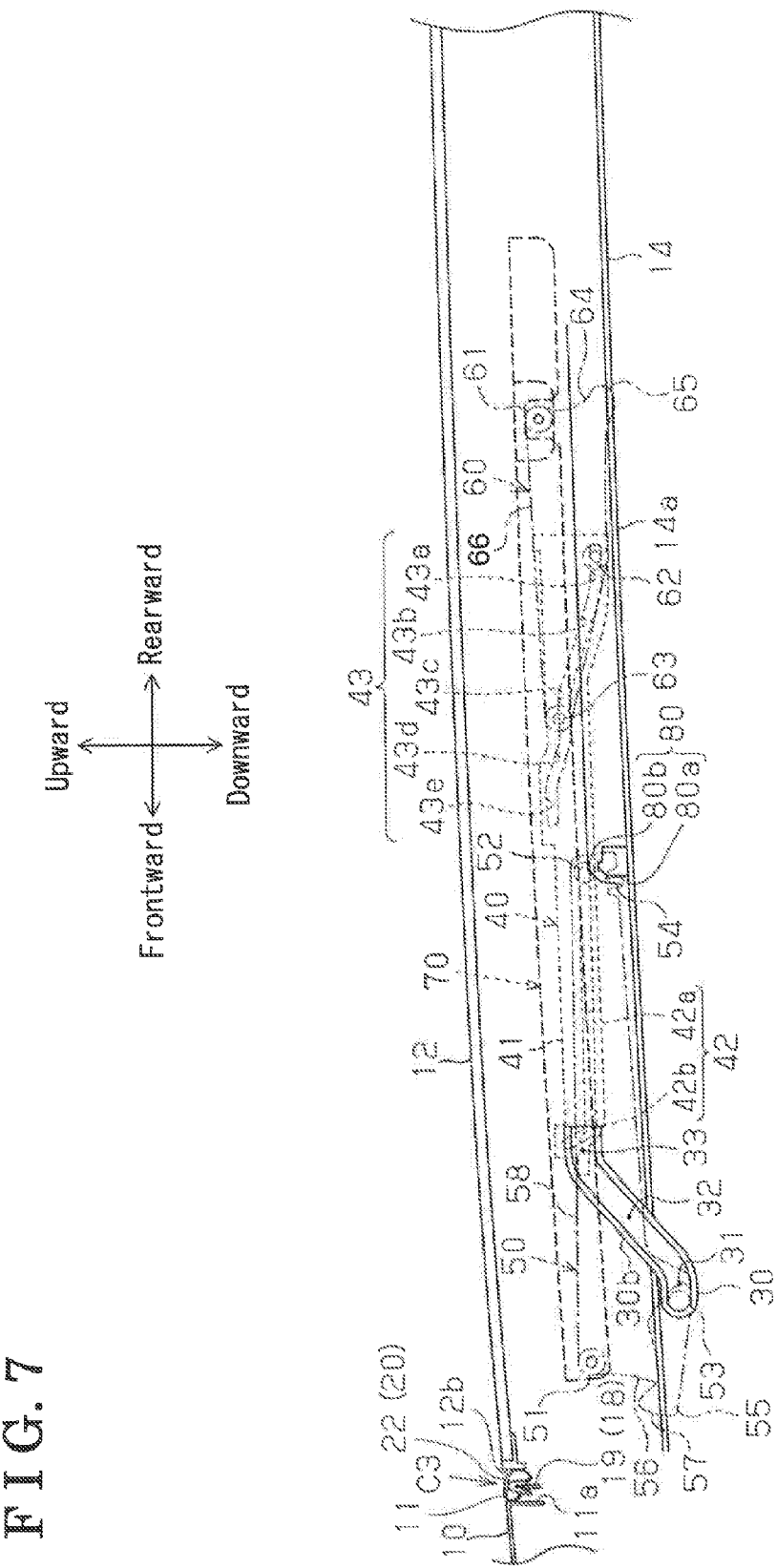
FIG. 7 is a cross-sectional view of the embodiment of the roof apparatus taken in a frontward-rearward direction of the vehicle illustrating the closed state of the roof apparatus.

As FIG. 7 illustrates, at a frontward end portion of the roof 10, a front housing 18, which is formed by a resin material or a similar material, extends in the vehicle width direction at a portion in the downward direction relative to the roof opening 11, where the vehicle width direction refers to a direction perpendicular to the surface where FIG. 7 is drawn. The front housing 18 includes a vertical wall 19 arranged to extend in the upward direction at a position within a clearance C3. The clearance C3 is formed between the edge portion 11a of the roof opening 11 and a frontward edge portion 12b that extends downwardly in a flange form at the end portion 91 of the front panel 12 that is in a fully closed state. The frontward-rearward portion weather strip 22 is fitted at a top portion of the vertical wall 19.

A frontward guide member 30 is attached to a frontward edge portion of the guide rail 14. Furthermore, a driving shoe 40 is arranged on the guide rail 14 at a position in the rearward direction relative to the frontward guide member 30 such that the driving shoe 40 may move in the frontward-rearward direction. A frontward link member 50 formed in a substantially flat plate form and a rearward link member 60 formed in a substantially flat plate form are retained to the guide rail 14. Furthermore, a retaining bracket 70 formed in an elongated form elongating in the frontward-rearward direction is fixed to a downward surface of the front panel 12 at a position in the upward direction relative to the guide rail 14. The frontward link member 50 connects to a frontward end portion of the retaining bracket 70 and the rearward link member 60 connects to a rearward end portion of the retaining bracket 70. Note that a limit block 80 is fixedly arranged on the bottom wall 14a of the guide rail 14.

The frontward guide member 30 includes a frontward groove portion 31 that extends in the frontward-rearward direction, a slanted groove portion 32 that connects to a rearward end of the frontward groove portion 31 and extends slantedly upward in the rearward direction, and a rearward groove portion 33 that connects to a rearward end of the slanted groove portion 32 and extends in the frontward-rearward direction. The frontward groove portion 31 is arranged at a position in the downward direction relative to the most downward end of the bottom wall 14a of the guide rail 14. A frontward end of the frontward groove portion 31 is closed. The rearward groove portion 33 is arranged at a position in the upward direction relative to the most downward end of the guide rail 14. A rearward end of the rearward groove portion 33 is open. At rearward of the rearward groove portion 33, the rearward groove portion 33 communicates with the rail portion 14b of the guide rail 14.

The driving shoe 40 is formed in a form such that the driving shoe 40 is contained at a position in a downward direction relative to the front panel 12 and to other members related to the front panel 12, where the front panel 12 is in a fully closed state. The driving shoe 40 includes a shoe body 41 formed in a flat plate form and extending in the frontward-rearward direction, a first groove 42 formed in an elongated groove form that extends in the frontward-rearward direction on the shoe body 41, and a second groove 43 formed in an elongated groove form that extends in the frontward-rearward direction on the shoe body 41. The shoe body 41 of the driving shoe 40 is connected to an appropriately selected actuator such that the driving shoe 40 may be driven to move in the frontward-rearward direction driven by the actuator.

The first groove 42 includes a rearward groove 42a that extends in the frontward-rearward direction and a frontward groove 42b that connects to a frontward end of the rearward groove 42a and extends slantedly upward in the frontward direction. Each of the rearward end of the rearward groove 42a and a frontward end of the frontward groove 42b is closed.

The second groove 43 is formed independently of the first groove 42 and arranged at a position rearward relative to the first groove 42. The second groove 43 includes a rearward front-rear groove 43a, a rearward slanted groove 43b that connects to a frontward end of the rearward front-rear groove 43a and extends slantedly upward in the frontward direction, a middle front-rear groove 43c that connects to a frontward end of the rearward slanted groove 43b, a frontward slanted groove 43d that connects to a frontward end of the middle front-rear groove 43c and extends slantedly upward in the frontward direction, and a frontward front-rear groove 43e that connects to a frontward end of the frontward slanted groove 43d. Note that each of the rearward front-rear groove 43a, the middle front-rear groove 43c, and the frontward front-rear groove 43e extends in the frontward-rearward direction. Each of a rearward end of the rearward front-rear groove 43a and a frontward end of the frontward front-rear groove 43e is closed.

The frontward link member 50 is provided with a form that elongates in the frontward-rearward direction in a side view. An upward surface formed in a substantially flat surface for nearly an entire span of the frontward link member 50 in a longitudinal direction is arranged to conform to the frontward-rearward direction such that the upward surface is contained at a position in a downward direction relative to the front panel 12 that is in a fully closed state. Hereinafter, the above-mentioned upward surface of the frontward link member 50 is referred to as a front guide surface 58. The frontward link member 50 includes a frontward connecting pin 51 at a frontward upward end portion of the frontward link member 50. The frontward connecting pin 51 extends in the vehicle width direction. The frontward link member 50 includes a frontward engaging pin 52 at a rearward end portion of the frontward link member 50. The frontward engaging pin 52 extends in the vehicle width direction. Furthermore, the frontward link member 50 includes a frontward retaining pin 53 at a frontward downward end portion of the frontward link member 50. The frontward retaining pin 53 extends in the vehicle width direction. In addition, the frontward link member 50 is formed with a limit pin 54 at a position near the frontward engaging pin 52.

The frontward connecting pin 51 connects to the retaining bracket 70 such that the frontward connecting pin 51 and the frontward end portion of the retaining bracket 70 may relatively rotate. The frontward engaging pin 52 is inserted into the first groove 42 of the driving shoe 40 such that the frontward engaging pin 52 may move rotationally relative to the driving shoe 40 and may move in the frontward-rearward direction. In a state where the front panel 12 is in the fully closed state, the frontward engaging pin 52 is arranged at a position at a rearward end of the rearward groove 42a.

The frontward retaining pin 53 is inserted into the frontward guide member 30 in a state where, for example, the front panel 12 is in the fully closed state. The frontward retaining pin 53 engages to the frontward guide member 30 such that the frontward retaining pin 53 may move rotationally relative to the frontward guide member 30 and may move in the frontward-rearward direction. In a state where the front panel 12 is in the fully closed state, the frontward retaining pin 53 is arranged at a position at a frontward end of the frontward groove portion 31. The limit pin 54 is arranged at a position in the frontward downward direction relative to the frontward engaging pin 52. In a state where the front panel 12 is in the fully closed state, the limit pin 54 is arranged at a position in the frontward direction relative to the limit block 80 and is in contact with a limiting surface 80a, which is a frontward end surface of the limit block 80. At this time, the limiting surface 80a is arranged at a position directly below the frontward engaging pin 52. Note that the limit block 80 is formed with a guide surface 80b that extends slantedly upward in the rearward direction from an upward end of the limiting surface 80a.

Figure 10:
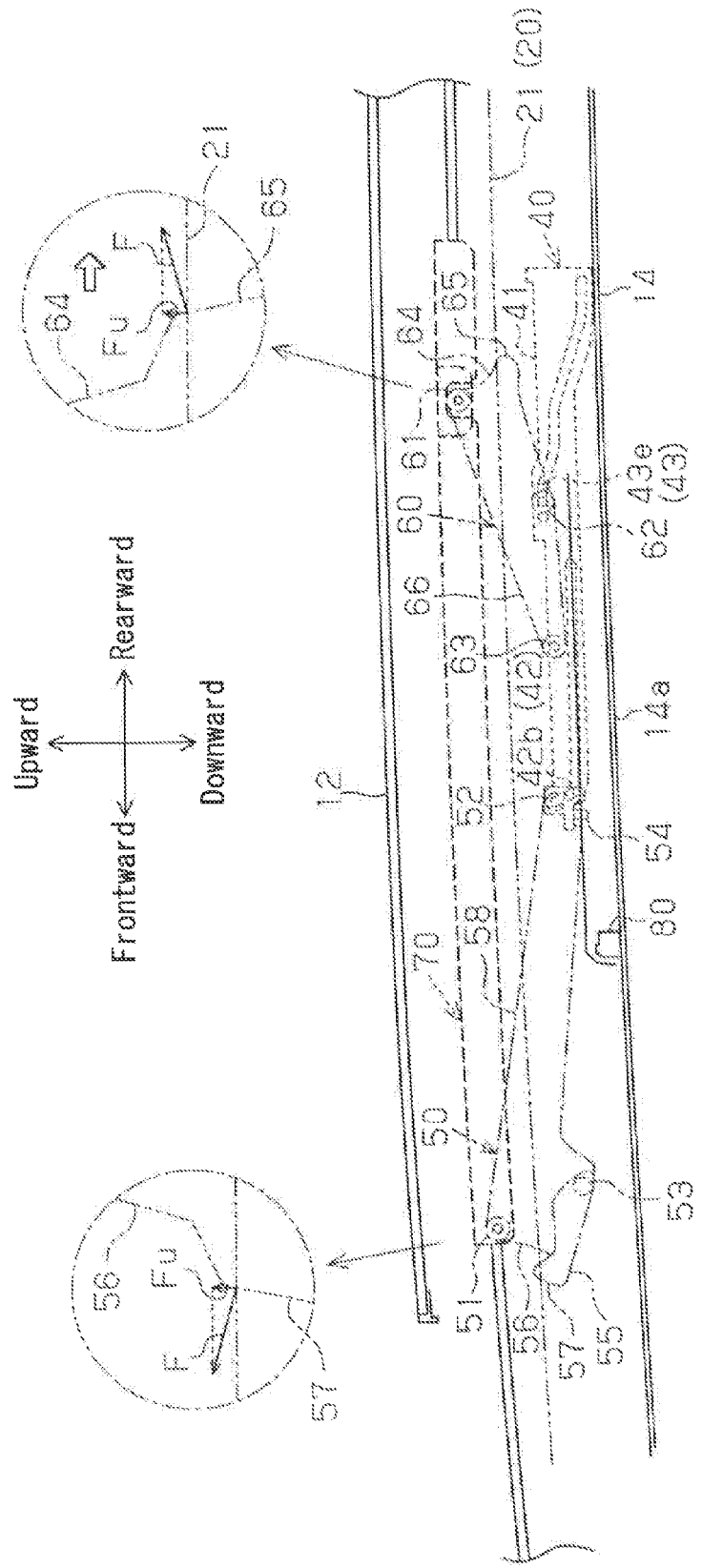
FIG. 10 is a cross-sectional view of the embodiment of the roof apparatus taken in the frontward-rearward direction of the vehicle illustrating the pop-up state of the roof apparatus.
Figure 11A:
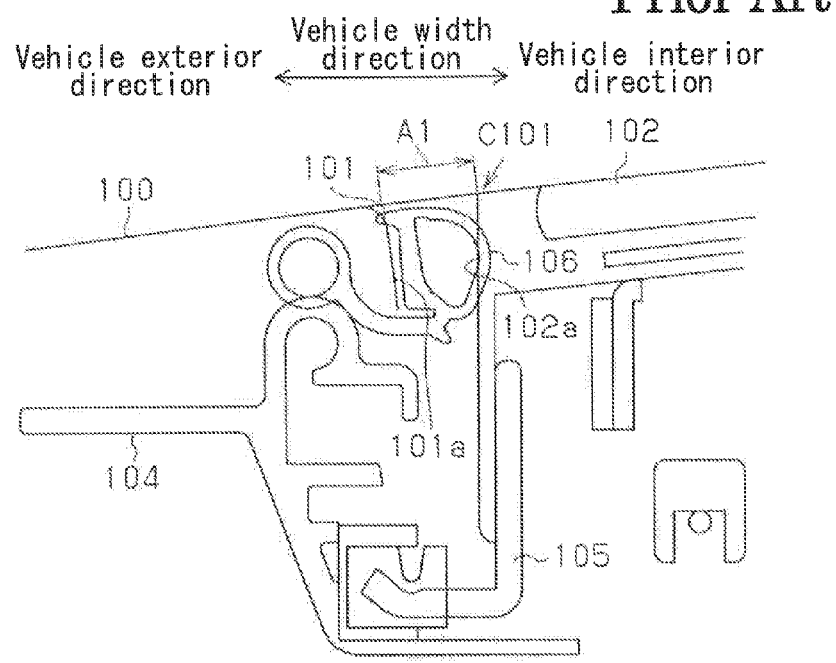
FIG. 11A is a cross-sectional view of a known roof apparatus taken in a vehicle width direction.
Figure 11B:
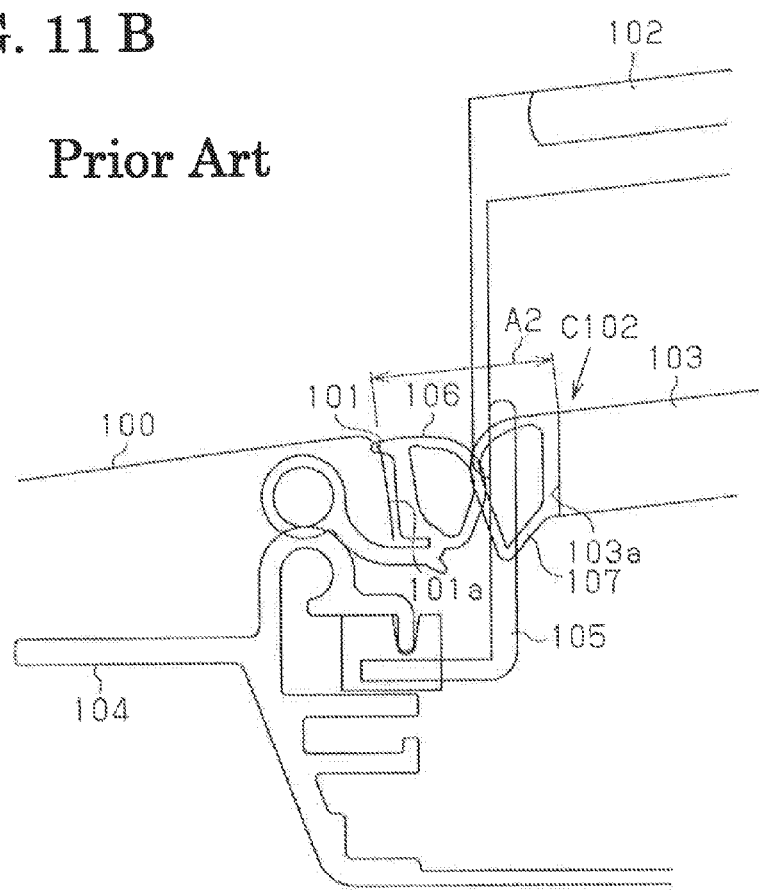
FIG. 11B is a cross-sectional view of the known roof apparatus taken in the vehicle width direction.

As FIG. 10 plainly illustrates, the frontward link member 50 includes a guide 55 having a hook-like form made of a resin material. The guide 55 is provided at a downward portion of the frontward link member 50 at a portion frontward relative to the frontward retaining pin 53. The guide 55 is formed in an integral manner with the frontward link member 50. Furthermore, a frontward end surface of the frontward link member 50 protrudes in the frontward direction at the guide 55, which is arranged at a downward portion of the frontward link member 50. The frontward link member 50 includes an upper frontward guide surface 56 that is formed at a frontward end surface of the frontward link member 50. The upper frontward guide surface 56 is provided at a portion above the guide 55. The upper frontward guide surface 56 is formed in a bow-like form having a curve where a shape of the curve is slightly bulging in the rearward direction. The frontward link member 50 also includes a lower frontward guide surface 57 that is formed at a frontward end surface of the frontward link member 50. The lower frontward guide surface 57 forms a substantially flat surface at a position of the guide 55. Note that each of the upper frontward guide surface 56 and the lower frontward guide surface 57 serves as a frontward guide surface.

As FIG. 7 illustrates, the rearward link member 60 is provided with a form that elongates in the frontward-rearward direction in a side view. An upward surface formed in a substantially flat surface for nearly an entire span of the rearward link member 60 in a longitudinal direction is arranged to conform to the frontward-rearward direction such that the upward surface is contained at a position in a downward direction relative to the front panel 12 that is in a fully closed state. Hereinafter, the above-mentioned upward surface of the rearward link member 60 is referred to as a rear guide surface 66. The rearward link member 60 includes a rearward connecting pin 61 at a rearward upward end portion of the rearward link member 60. The rearward connecting pin 61 extends in the vehicle width direction. Furthermore, the rearward link member 60 includes a rearward engaging pin 62 at a downward end portion of the rearward link member 60, the portion at a middle in the frontward-rearward direction of the rearward link member 60. The rearward engaging pin 62 extends in the vehicle width direction. Furthermore, the rearward link member 60 includes a rearward retaining pin 63 at a frontward end portion of the rearward link member 60. The rearward retaining pin 63 extends in the vehicle width direction.

The rearward connecting pin 61 connects to the retaining bracket 70 such that the rearward connecting pin 61 may move rotationally relative to the rearward end portion of the retaining bracket 70. The rearward engaging pin 62, which is arranged at a middle portion in the longitudinal direction of the rearward link member 60, is inserted into the second groove 43 of the driving shoe 40 such that the rearward engaging pin 62 may move rotationally relative to the driving shoe 40 and may move in the frontward-rearward direction. In a state where the front panel 12 is in the fully closed state, the rearward engaging pin 62 is arranged at a position at the rearward end of the rearward front-rear groove 43a. The rearward retaining pin 63 is inserted into the rail portion 14b of the guide rail 14 so that the rearward retaining pin 63 engages to the rail portion 14b in a manner such that the rearward retaining pin 63 may move rotationally relative to the rail portion 14b and may move in the frontward-rearward direction.

As FIG. 10 plainly illustrates, a rearward end surface of the rearward link member 60 is formed with an upper rearward guide surface 64 formed in a bow-like form having a curve where a shape of the curve is slightly bulging in the frontward direction. At a portion below the upper rearward guide surface 64, a lower rearward guide surface 65 that protrudes in the rearward direction in a peninsular shape is formed. Note that each of the upper rearward guide surface 64 and the lower rearward guide surface 65 serves as a rearward guide surface.

A case where the driving shoe 40 moves in the rearward direction in a state where the front panel 12 is in the fully closed state, which is the state FIG. 7 illustrates, will be described. In the state where the front panel 12 is in the fully closed state, the limit pin 54 of the frontward link member 50, which is arranged at a position in the frontward direction of the limit block 80, is in contact with the limiting surface 80a in a locking manner so that the frontward link member 50 as well as the retaining bracket 70 is restrained from a movement in the rearward direction. Accordingly, the driving shoe 40 moves in the rearward direction relative to the frontward link member 50 while the frontward engaging pin 52 freely moves in the rearward groove 42a of the first groove 42 on the driving shoe 40. Meanwhile, the rearward engaging pin 62 of the rearward link member 60 is guided to move in the second groove 43 so that the rearward link member 60 makes a rotational movement with the rearward retaining pin 63 as the pivoting point and without a displacement in the rearward direction, the rotational movement that raises a position of the rearward connecting pin 61 in the upward direction.

Figure 8:
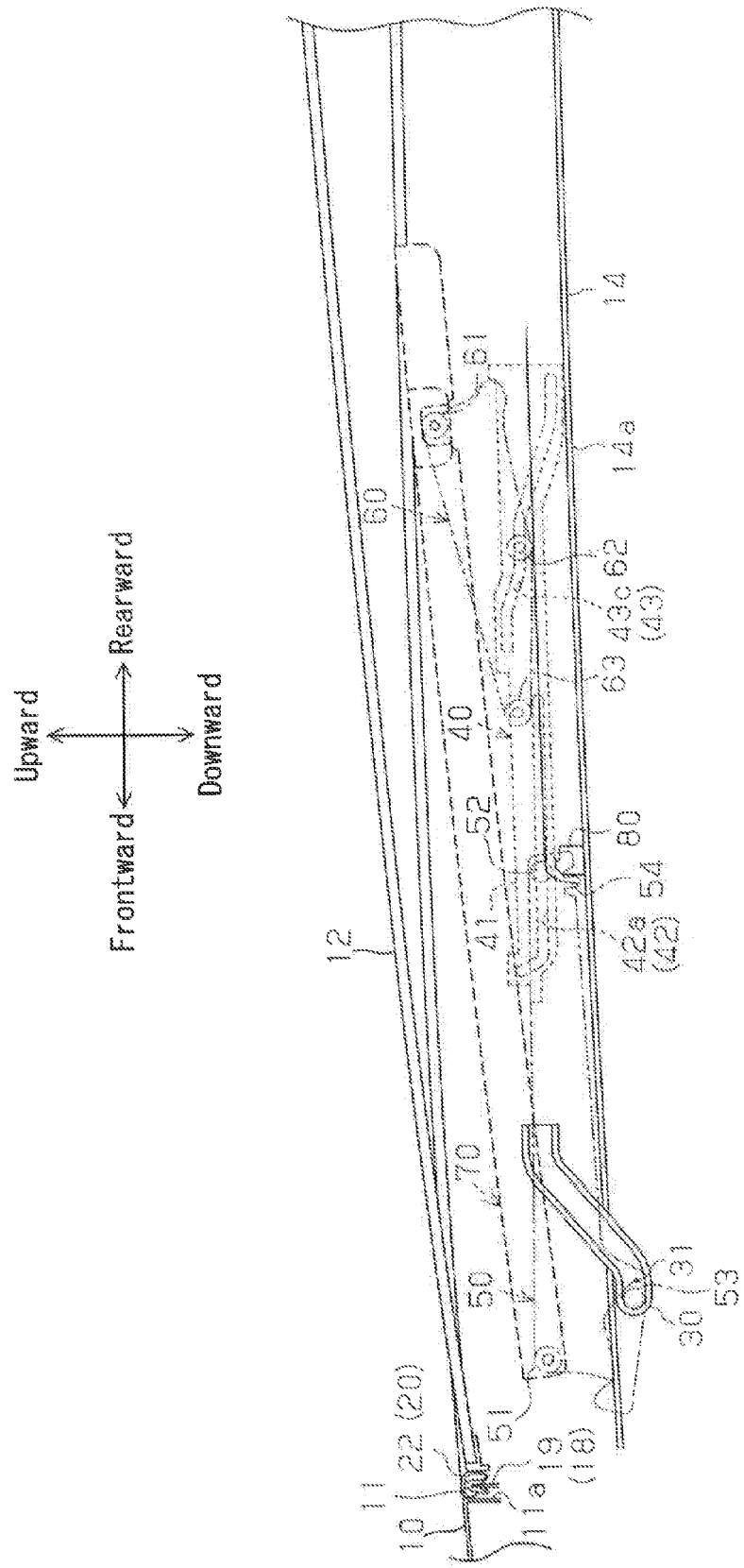
FIG. 8 is a cross-sectional view of the embodiment of the roof apparatus taken in the frontward-rearward direction of the vehicle illustrating a tilt-up state of the roof apparatus.

Accordingly, the retaining bracket 70, which is connected to the frontward link member 50 at the frontward end portion and connected to the rearward link member 60 at the rearward end portion, makes a tilt-up movement along with the front panel 12 where the tilt-up movement refers to a movement where a rearward portion of the retaining bracket 70 is raised in the upward direction with a frontward portion of the retaining bracket 70 as the pivoting point. In a state where the rearward engaging pin 62 of the rearward link member 60 reaches the middle front-rear groove 43c of the second groove 43, which is a state where FIG. 8 illustrates, the movement that makes the rearward portion of the front panel 12 to rise in the upward direction with the frontward portion of the front panel 12 as the pivoting point ends. In other words, a transition movement to bring the front panel 12 into the tilt-up state ends.

Figure 9:
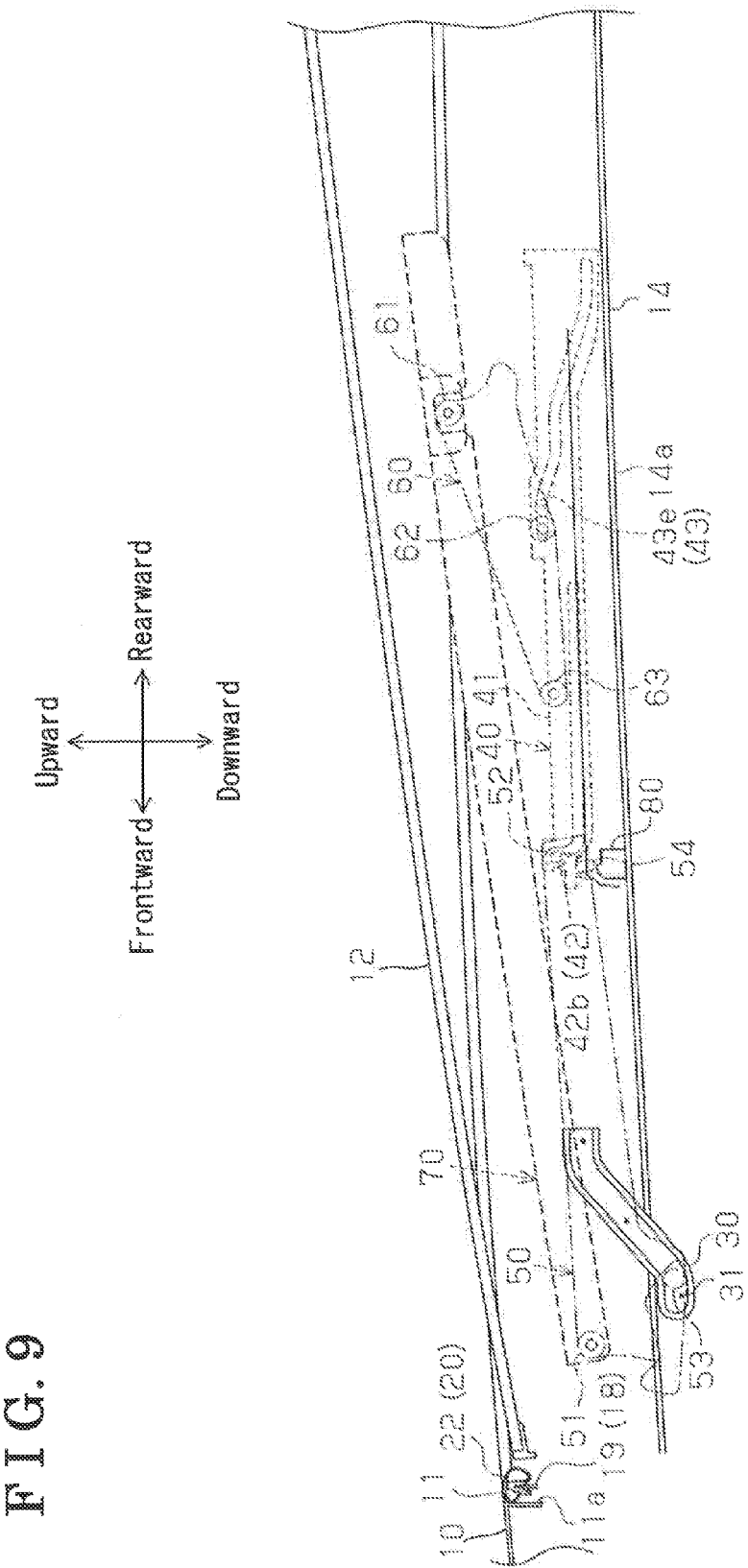
FIG. 9 is a cross-sectional view of the embodiment of the roof apparatus taken in the frontward-rearward direction of the vehicle illustrating a transition state from the tilt-up state to a pop-up state of the roof apparatus.

A case where the driving shoe 40 further moves in the rearward direction following the end of the above-described tilt-up movement will be described next. Similarly to the tilt-up movement described earlier, the retaining bracket 70, which is connected to the frontward link member 50 at the frontward end portion and connected to the rearward link member 60 at the rearward end portion, makes a furthermore tilt-up movement along with the front panel 12. In a state where the frontward front-rear groove 43e of the second groove 43 reaches the rearward engaging pin 62 of the rearward link member 60, which is a state where FIG. 9 illustrates, a position of the driving shoe 40 relative to the rearward engaging pin 62 is locked thereat by a movement of the driving shoe 40 in the rearward direction relative to the rearward engaging pin 62 being restrained. At the same time, the frontward groove 42b of the first groove 42 reaches the frontward engaging pin 52 of the frontward link member 50. Accordingly, a position of the driving shoe 40 relative to the frontward engaging pin 52 is locked thereat by a movement of the driving shoe 40 in the rearward direction relative to the frontward engaging pin 52 being restrained. At this time, the frontward link member 50 and the rearward link member 60 are arranged to integrally move with the driving shoe 40 in the rearward direction and the position of the limit pin 54 is displaced in a direction obliquely upward in the rearward direction along the guide surface 80b of the limit block 80. By the limit pin 54 climbing over the limit block 80, a movement of the frontward link member 50 in the rearward direction is allowed, the movement that has been restrained up to this point.

As a result, in a state where the driving shoe 40 further moves in the rearward direction, the frontward link member 50 and the rearward link member 60 move in the rearward direction together with the retaining bracket 70 by the frontward groove 42b of the first groove 42 pulling the frontward engaging pin 52 and the frontward front-rear groove 43e of the second groove 43 pulling the rearward engaging pin 62. At this time, a posture of the rearward link member 60 is rigidly retained by the rearward engaging pin 62 that is at a position of the frontward front-rear groove 43e of the second groove 43 and by the rearward retaining pin 63 that slides on the rail portion 14b. Meanwhile, the frontward retaining pin 53 of the frontward link member 50 is guided to move in the frontward guide member 30 so that the frontward link member 50 makes a rotational movement with the frontward engaging pin 52 as the pivoting point, the rotational movement that raises a position of the frontward connecting pin 51 in the upward direction. Accordingly, the retaining bracket 70, which is connected to the frontward link member 50 at the frontward end portion and connected to the rearward link member 60 at the rearward end portion, makes a pop-up movement along with the front panel 12 where the pop-up movement refers to a movement where an entire portion of the front panel 12 is raised in the upward direction relative to the roof 10 by raising a frontward portion of the retaining bracket 70 in the upward direction along with the front panel 12 with the rearward connecting pin 61 at a rearward portion of the retaining bracket 70 as the pivoting point.

In accordance with the above-mentioned pop-up movement, the frontward retaining pin 53 that is guided to move in the frontward guide member 30 makes entry into the rail portion 14b of the guide rail 14 so that a transition movement to bring the front panel 12 to a pop-up state ends where the pop-up state refers to a state where the entire portion of the front panel 12 is raised in the upward direction relative to the roof 10. As a result, in a state where the driving shoe 40 further moves in the rearward direction, the frontward link member 50 and the rearward link member 60 integrally move in the rearward direction while sliding each of the frontward retaining pin 53 and the rearward retaining pin 63 on the rail portion 14b. At this time, a posture of the frontward link member 50 is rigidly retained by the frontward engaging pin 52 that is at a position of the frontward groove 42b of the first groove 42 and by the frontward retaining pin 53 that slides on the rail portion 14b. As described earlier, the posture of the rearward link member 60 is rigidly retained by the rearward engaging pin 62 that is at the position of the frontward front-rear groove 43e of the second groove 43 and by the rearward retaining pin 63 that slides on the rail portion 14b. Furthermore, as FIG. 10 illustrates, the front panel 12 moves in the rearward direction while the front panel 12 is retained in the pop-up state so that the roof opening 11 is opened.

A case where the driving shoe 40 moves in the frontward direction in a state where the front panel 12 is in an open state, which in other words is in a state where the front panel 12 is in the pop-up state, will be described next. At this time, the frontward link member 50, which is pushed by the frontward groove 42b of the first groove 42 of the driving shoe 40, integrally moves in the frontward direction with the rearward link member 60 and with the retaining bracket 70. At this time, a posture of each of the frontward link member 50 and the rearward link member 60 is rigidly retained by the aforementioned members in the aforementioned states, so that the front panel 12 moves in the frontward direction while retaining the pop-up state to close the roof opening 11.

In accordance with the above-mentioned movement, the frontward retaining pin 53 that slides on the rail portion 14b is guided to make an entry into the frontward guide member 30. In a state where the frontward retaining pin 53 is guided to move in the frontward guide member 30, the frontward link member 50, which is guided to move by a movement of the frontward retaining pin 53 in the frontward guide member 30, makes a rotational movement that brings the frontward connecting pin 51 to descend in the downward direction with the frontward engaging pin 52 as the pivoting point. In a state where the frontward retaining pin 53 of the frontward link member 50 reaches the frontward groove portion 31 of the frontward guide member 30, a position of the frontward link member 50 in the frontward direction is locked thereat by a displacement of the frontward link member 50 in the frontward direction being restrained. The retaining bracket 70, which is connected to the frontward link member 50 at the frontward end portion and connected to the rearward link member 60 at the rearward end portion, descends in the downward direction at the frontward portion along with the front panel 12 with the rearward connecting pin 61 as the pivoting point, the rearward connecting pin 61 that is arranged at the rearward portion of the retaining bracket 70. Accordingly, a transition movement to bring the front panel 12 to the tilt-up state ends. In other words, the front panel 12 returns to the tilt-up state. Along with the completion of the transition movement, the limit pin 54 of the frontward link member 50 comes to a position at the frontward of the limit block 80.

After the completion of the above-mentioned transition movement, in a state where the driving shoe 40 further moves in the frontward direction while the frontward engaging pin 52 freely moving in the rearward groove 42a of the first groove 42, the rearward link member 60 makes a rotational movement with the rearward retaining pin 63 as the pivoting point and without a displacement in the frontward direction so that a position of the rearward connecting pin 61 descends in the downward direction.

Accordingly, the retaining bracket 70, which is connected to the frontward link member 50 at the frontward end portion and connected to the rearward link member 60 at the rearward end portion, makes a tilt-down movement along with the front panel 12 where the tilt-down movement refers to a movement where a rearward portion of the retaining bracket 70 descends in the downward direction with the frontward portion of the retaining bracket 70 as the pivoting point. In a state where the rearward engaging pin 62 of the rearward link member 60 reaches the rearward front-rear groove 43a of the second groove 43, the front panel 12 is returned to the fully closed state, which is the state FIG. 7 illustrates.

Figure 5:
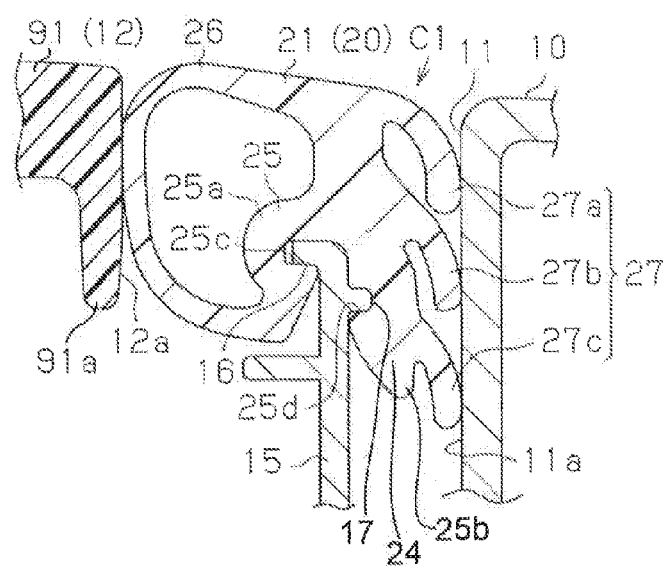
FIG. 5 is a cross-sectional view of the embodiment of the roof apparatus taken in a vehicle width direction illustrating a side portion weather strip and other components in a frontward portion of a vehicle.
Figure 6A:
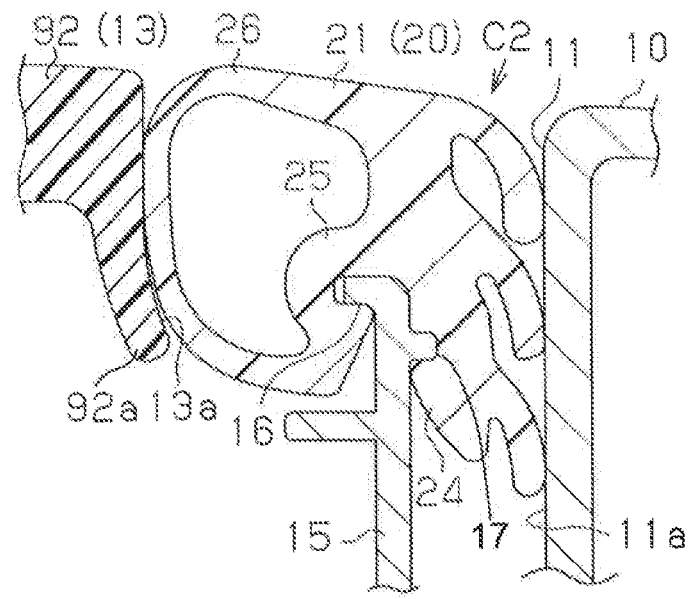
FIG. 6A is a cross-sectional view of the embodiment of the roof apparatus taken in the vehicle width direction illustrating the side portion weather strip and other components in a rearward portion of the vehicle.
Figure 6B:
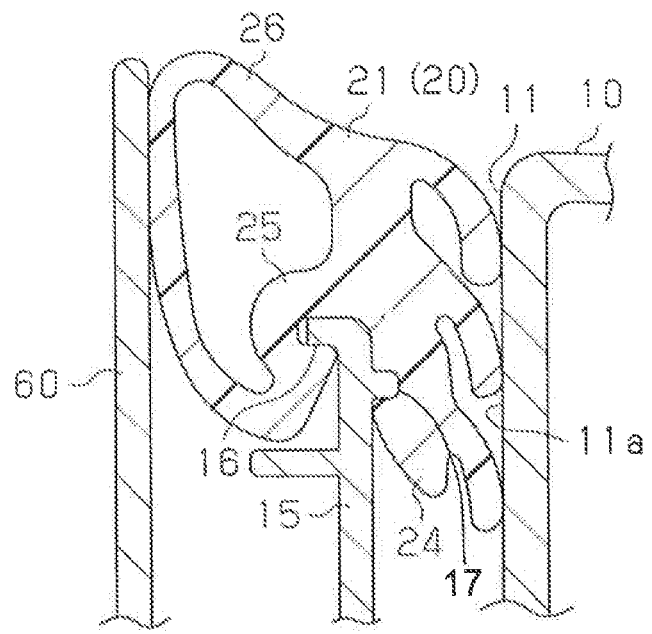
FIG. 6B is a cross-sectional view of the embodiment of the roof apparatus taken in the vehicle width direction illustrating the side portion weather strip and other components in a rearward portion of the vehicle.

The side portion weather strip 21 according to the embodiment will be described next. As FIGS. 5, 6A, and 6B illustrate, the side portion weather strip 21 includes a portion to be retained 24, a first seal portion 26 that connects to the portion to be retained 24, and a second seal portion 27 that connects to the portion to be retained 24. The portion to be retained 24 includes a fitting portion 25 that fits to the vertical wall portion 15. The fitting portion 25 includes a pair of protrusions 25a, 25b that clamp the vertical wall portion 15 from the vehicle interior direction and from the vehicle exterior direction. The vehicle interior direction refers to the direction where the edge portion 12a of the front panel 12, the edge portion 12a that is in the vehicle width direction, is provided. The vehicle exterior direction refers to the direction where the edge portion 11a of the roof opening 11 is provided.

The protrusion 25a, which is one of the pair of protrusions 25a, 25b, is provided with a curve that bulges in the vehicle interior direction similarly shaped as the first locking portion 16. At a downward end portion of the protrusion 25a, a first locking projection 25c having a hook-like form is formed. The first locking projection 25c locks to a downward surface of the first locking portion 16. The protrusion 25b, which is the other one of the pair of protrusions 25a, 25b, projects in a form having a plateau-like portion, the form in accordance with the second locking portion 17. At a downward end portion of the protrusion 25b, a second locking projection 25d having a hook-like form is formed. The second locking projection 25d locks to a downward surface of the second locking portion 17. In a state where the fitting portion 25 is fitted at the vertical wall portion 15, the portion to be retained 24 is restrained from being pulled off from the vertical wall portion 15 by locking the first locking projection 25c at the downward surface of the first locking portion 16 and by locking the second locking projection 25d at the downward surface of the second locking portion 17.

The first seal portion 26 is formed in a form having a bow-like shape cross section such that the first seal portion 26 bulges in the vehicle interior direction, which is the direction where the edge portion 12a of the front panel 12, the edge portion 12a that is in the vehicle width direction, is provided. The first seal portion 26 connects to each of an upper end of the portion to be retained 24 and a lower end of the portion to be retained 24 that is at a lower end of the protrusion 25a. In a state where the front panel 12 is in a fully closed state, the first seal portion 26 is resiliently deformed such that the first seal portion 26 forms a contact portion that extends in the vehicle height direction that makes contact with the edge portion 12a of the front panel 12, the edge portion 12a that is in the vehicle width direction, so that the first seal portion 26 makes liquid tight contact with the edge portion 12a of the front panel 12. Likewise, the first seal portion 26 is resiliently deformed such that the first seal portion 26 forms a contact portion that extends in the vehicle height direction that makes contact with the edge portion 13a of the rear panel 13, the edge portion 13a that is in the vehicle width direction, so that the first seal portion 26 makes liquid tight contact with the edge portion 13a of the rear panel 13.

The second seal portion 27 includes a multiple number of lip portions 27a, 27b, 27c, that connects to the portion to be retained 24. In the roof apparatus according to the embodiment, the number of the lip portions is three. The lip portions 27a, 27b, 27c are arranged in the vehicle height direction separated by a distance between each of the lip portions 27a, 27b, 27c. The second seal portion 27 makes liquid tight contact with the edge portion 11a of the roof opening 11 at the lip portions 27a, 27b, 27c.

The rearward link member 60, which is retained to the guide rail 14 via the driving shoe 40, is arranged at a position in the vehicle width direction that is between the vertical wall portion 15 and the edge portion 13a of the rear panel 13, the edge portion 13a that is in the vehicle width direction. In other words, the rearward link member 60 is also at a position in the vehicle width direction that is between the vertical wall portion 15 and the edge portion 12a of the front panel 12, the edge portion 12a that is in the vehicle width direction. In a state where the front panel 12 is raised in the upward direction relative to the roof opening 11, or relative to the roof 10, which is in a state where the roof opening 11 is in an open state, the rearward link member 60 projects above the side portion weather strip 21 through the clearance C2 or the clearance C1. At this time, the first seal portion 26 of the side portion weather strip 21 resiliently deforms in the upward direction in accordance with an increasing amount of contact area in the vehicle height direction between the first seal portion 26 of the side portion weather strip 21 and the rearward link member 60. At another time, in a state where the front panel 12 descends in the downward direction relative to the roof opening 11, or relative to the roof 10, to close the roof opening 11, the rearward link member 60 recedes to a position below the side portion weather strip 21. At this time, the edge portion 12a of the front panel 12, the edge portion 12a that is in the vehicle width direction, makes contact with the side portion weather strip 21 while making the first seal portion 26 of the side portion weather strip 21 to resiliently deform. The frontward link member 50 is arranged with characteristics similar to the characteristics of the rearward link member 60 described herewith.

An alternate long and two short dashes line in FIG. 10 illustrates a position of a downward surface of the side portion weather strip 21, which in other words is a position of the downward surface of the first seal portion 26, the position relative to the frontward link member 50 and the rearward link member 60. As the alternate long and two short dashes line in FIG. 10 illustrates, each of the frontward link member 50 and the rearward link member 60 slides on the side portion weather strip 21 in a state where the front panel 12 in the pop-up state makes a sliding movement. Accordingly, for example, in a state where the front panel 12 moves in the rearward direction, the side portion weather strip 21 is pressed by the front guide surface 58 of the frontward link member 50 and each of the upper rearward guide surface 64 and the lower rearward guide surface 65 of the rearward link member 60. Likewise, in a state where the front panel 12 moves in the frontward direction, the side portion weather strip 21 is pressed by each of the upper frontward guide surface 56 and the lower frontward guide surface 57 of the frontward link member 50 and the rear guide surface 66 of the rearward link member 60.

According to the embodiment of the roof apparatus, for example, in a state where the front panel 12 moves in the rearward direction, a component of force that causes the side portion weather strip 21 to resiliently deform in the upward direction is generated in a case where the side portion weather strip 21 is pressed at the first seal portion 26 by the front guide surface 58 of the frontward link member 50 and each of the upper rearward guide surface 64 and the lower rearward guide surface 65 of the rearward link member 60. Each of the front guide surface 58, the upper rearward guide surface 64, and the lower rearward guide surface 65 serves as a rearward guide surface that is arranged at an end surface that comes into contact with the side portion weather strip 21 first in a state where the frontward link member 50 and the rearward link member 60 make a movement in the rearward direction, the movement that accompanies a movement of the front panel 12. In other words, as FIG. 10 schematically illustrates, in a state where the lower rearward guide surface 65 presses on the downward portion of the side portion weather strip 21, a pressure F generates a component of force Fu that causes the side portion weather strip 21 to resiliently deform in the upward direction. The pressure F is a force that applies on the downward portion of the side portion weather strip 21. The pressure F is upwardly angled relative to the rearward direction by an amount in accordance with an angle of the lower rearward guide surface 65. A component of force Fu is generated similarly in a state where the upper rearward guide surface 64 presses on an upward portion of the side portion weather strip 21. A component of force Fu is generated similarly in a state where the front guide surface 58 of the frontward link member 50 presses on the side portion weather strip 21.

Furthermore, in a state where the front panel 12 moves in the frontward direction, a component of force that causes the side portion weather strip 21 to resiliently deform in the upward direction is generated in a case where the side portion weather strip 21 is pressed at the first seal portion 26 by each of the upper frontward guide surface 56 and the lower frontward guide surface 57 of the frontward link member 50 and the rear guide surface 66 of the rearward link member 60. Each of the upper frontward guide surface 56, the lower frontward guide surface 57, and the rear guide surface 66 serves as a frontward guide surface that is arranged at an end surface that comes into contact with the side portion weather strip 21 first in a state where the frontward link member 50 and the rearward link member 60 make a movement in the frontward direction, the movement that accompanies a movement of the front panel 12. In other words, as FIG. 10 schematically illustrates, in a state where the lower frontward guide surface 57 presses on the downward portion of the side portion weather strip 21, a pressure F generates a component of force Fu that causes the side portion weather strip 21 to resiliently deform in the upward direction. The pressure F is a force that applies on the downward portion of the side portion weather strip 21. The pressure F is upwardly angled relative to the frontward direction by an amount in accordance with an angle of the lower frontward guide surface 57. A component of force Fu is generated similarly in a state where the upper frontward guide surface 56 presses on an upward portion of the side portion weather strip 21. A component of force Fu is generated similarly in a state where the rear guide surface 66 of the rearward link member 60 presses on the side portion weather strip 21.

An operation of the roof apparatus according to the embodiment will be described next. As described earlier, in a state where the front panel 12 is raised in the upward direction relative to the roof opening 11, or relative to the roof 10, to bring the roof opening 11 in an open state, the frontward link member 50 and the rearward link member 60 project above the side portion weather strip 21 through the clearance C2 or the clearance C1, as FIG. 4 illustrates. At this time, the first seal portion 26 of the side portion weather strip 21 resiliently deforms in the upward direction in accordance with an increasing amount of contact area in the vehicle height direction between the first seal portion 26 of the side portion weather strip 21 and the rearward link member 60.

As FIG. 10 illustrates, for example, in a state where the front panel 12 moves in the rearward direction, a component of force that causes the side portion weather strip 21 to resiliently deform in the upward direction is generated in a case where the side portion weather strip 21 is pressed by the front guide surface 58 of the frontward link member 50 and by each of the upper rearward guide surface 64 and the lower rearward guide surface 65 of the rearward link member 60. Accordingly, the side portion weather strip 21 is guided to resiliently deform in the upward direction by the front guide surface 58 of the frontward link member 50 and by each of the upper rearward guide surface 64 and the lower rearward guide surface 65 of the rearward link member 60 pushing the side portion weather strip 21 in the upward direction. As a result, the frontward link member 50 and the rearward link member 60 slide on the side portion weather strip 21 while making the side portion weather strip 21 to resiliently deform upwardly in a smooth manner.

Especially, the lower rearward guide surface 65 of the rearward link member 60 is formed in a form such that protrudes in the rearward direction relative to the upper rearward guide surface 64, the rearward direction which in other words is in an advance direction of the rearward link member 60 in a state where the rearward link member 60 moves in the rearward direction, so that the lower rearward guide surface 65 makes contact with the downward portion of the side portion weather strip 21 first, or in advance to other portions of the rearward link member 60. As a result, a resilient deformation of the side portion weather strip 21 begins from the downward portion of the side portion weather strip 21 and deforms toward the upward direction so that the resilient deformation is allowed furthermore smoothly.

Note that, as FIG. 4 illustrates, each of the rearward link member 60 and the frontward link member 50 projects above the side portion weather strip 21 through the clearance C2. In the roof apparatus according to the embodiment, the second flange portion 92a of the end portion 92 slants toward the vehicle exterior direction as the second flange portion 92a extends downwardly at the edge portion 13a of the rear panel 13, the edge portion 13a that is in the vehicle width direction. Accordingly, for example, in a case where the rearward link member 60 makes a sliding movement on the side portion weather strip 21 at a position that is outward of the edge portion 13a of the rear panel 13, the edge portion 13a that is in the vehicle width direction, a slanted form of the second flange portion 92a decreases an amount of clearance in the vehicle width direction between the edge portion 13a of the rear panel 13, the edge portion 13a that is in the vehicle width direction, and the rearward link member 60 by an amount of the slanted form.

Furthermore, as FIG. 10 illustrates, for example, in a state where the front panel 12 moves in the frontward direction, a component of force that causes the side portion weather strip 21 to resiliently deform in the upward direction is generated in a case where the side portion weather strip 21 is pressed by each of the upper frontward guide surface 56 and the lower frontward guide surface 57 of the frontward link member 50 and by the rear guide surface 66 of the rearward link member 60. Accordingly, the side portion weather strip 21 is guided to resiliently deform in the upward direction by each of the upper frontward guide surface 56 and the lower frontward guide surface 57 of the frontward link member 50 and by the rear guide surface 66 of the rearward link member 60. As a result, the frontward link member 50 and the rearward link member 60 slide on the side portion weather strip 21 while making the side portion weather strip 21 to resiliently deform upwardly in a smooth manner.

Especially, the lower frontward guide surface 57 of the frontward link member 50 is formed in a form such that protrudes in the frontward direction relative to the upper frontward guide surface 56, the frontward direction which in other words is an advance direction of the frontward link member 50 in a state where the frontward link member 50 moves in the frontward direction, so that the lower frontward guide surface 57 makes contact with the downward portion of the side portion weather strip 21 first, or in advance to other portions of the frontward link member 50. As a result, a resilient deformation of the side portion weather strip 21 begins from the downward portion of the side portion weather strip 21 and deforms toward the upward direction so that the resilient deformation is allowed furthermore smoothly.

Note that, as FIG. 3 illustrates, in a state where the edge portion 12a of the front panel 12, the edge portion 12a that is in the vehicle width direction, descends on the side portion weather strip 21 at the first seal portion 26 with a descending movement of the front panel 12, which in other words is a closing operation, the first seal portion 26 makes liquid tight contact with the edge portion 12a of the front panel 12, the edge portion 12a that is in the vehicle width direction, while the first seal portion 26 resiliently deforms in accordance with the descending movement. In the roof apparatus according to the embodiment, the first flange portion 91a of the end portion 91 slants toward the vehicle interior direction as the first flange portion 91a extends downwardly at the edge portion 12a of the front panel 12, the edge portion 12a that is in the vehicle width direction. Accordingly, in a state where the front panel 12 descends, which in other words is in a state where the front panel 12 is in a closing operation, a slanted form of the first flange portion 91a guides the side portion weather strip 21 to make liquid tight contact with the edge portion 12a at the end portion 91 of the front panel 12, the edge portion 12a that is in the vehicle width direction.

The arrangements of the roof apparatus according to the embodiment is advantageous in following aspects. Firstly, for example, in a state where the front panel 12 is in the fully closed state, the side portion weather strip 21 makes liquid tight contact with each of the edge portion 12a at the end portion 91 of the front panel 12 and the edge portion 13a at the end portion 92 of the rear panel 13 so that penetration of a liquid form similar to water droplets and rain droplets may be prevented. Furthermore, in a state where the frontward link member 50 and the rearward link member 60 make a frontward-rearward movement that accompanies a sliding movement of the front panel 12, the side portion weather strip 21 is guided to resiliently deform upwardly either by the front guide surface 58 and each of the upper rearward guide surface 64 and the lower rearward guide surface 65, or by each of the upper frontward guide surface 56 and the lower frontward guide surface 57 and the rear guide surface 66. Accordingly, the frontward link member 50 and the rearward link member 60 slide on the side portion weather strip 21 while making the side portion weather strip 21 to resiliently deform upwardly in a smooth manner. As a result, the side portion weather strip 21 is restrained from receiving an excessive load from the sliding movement of the front panel 12 and from repeating unstable resilient deformations that may cause duration of life of the side portion weather strip 21 to lessen.

Secondly, in the roof apparatus according to the embodiment, in a state where the front panel 12 makes a sliding movement, each of the lower frontward guide surface 57 and the lower rearward guide surface 65, each of which makes contact with a downward portion of the side portion weather strip 21, protrudes in an advance direction of a movement of the frontward link member 50 and the rearward link member 60 in a frontward-rearward direction. Accordingly, each of the lower frontward guide surface 57 and the lower rearward guide surface 65 makes contact with a downward portion of the side portion weather strip 21 first, or in advance to other portions of the frontward link member 50 and the rearward link member 60, in a state where the frontward link member 50 and the rearward link member 60 make a frontward-rearward direction movement that accompanies a sliding movement of the front panel 12. Accordingly, the side portion weather strip 21 starts resilient deformation from a downward direction toward an upward direction, which makes the side portion weather strip 21 to resiliently deform even more smoothly.

Thirdly, in the roof apparatus according to the embodiment, the first flange portion 91*a* at the end portion 91 of the front panel 12 extends downwardly in the vehicle height direction while slanting inwardly in the vehicle width direction. Accordingly, for example, in a case where the front panel 12 that has been raised in the upward direction relative to the roof opening 11 descends to close the roof opening 11, a slanted form of the first flange portion 91*a* guides the side portion weather strip 21 to make liquid tight contact with the edge portion 12*a* of the front panel 12, the edge portion 12*a* that is in the vehicle width direction. Accordingly, the side portion weather strip 21 may be allowed to make liquid tight contact with the edge portion 12*a* of the front panel 12, the edge portion 12*a* that is in the vehicle width direction, while making the side portion weather strip 21 to resiliently deform smoothly. As a result, the side portion weather strip 21 is restrained from receiving an excessive load from a closing movement of the front panel 12 and repeating unstable resilient deformations that may cause duration of life of the side portion weather strip 21 to lessen.

Furthermore, the second flange portion 92*a* at the end portion 92 of the rear panel 13 extends downwardly in the vehicle height direction while slanting outwardly in the vehicle width direction. Accordingly, for example, in a case where the rearward link member 60 and the frontward link member 50 make a sliding movement on the side portion weather strip 21 at a position that is outward of the edge portion 13*a* at the end portion 92 of the rear panel 13, the edge portion 13*a* that is in the vehicle width direction, a slanted form of the second flange portion 92*a* decreases an amount of clearance in the vehicle width direction, for example, between the edge portion 13*a* at the end portion 92 of the rear panel 13, the edge portion 13*a* that is in the vehicle width direction, and the rearward link member 60 by an amount of the slanted form. Furthermore, for example, in a case where the front panel 12 is in an open state, similarly, the slanted form of the second flange portion 92*a* decreases an amount of clearance in the vehicle width direction, for example, between the edge portion 13*a* at the end portion 92 of the rear panel 13, the edge portion 13*a* in the vehicle width direction, and the rearward link member 60. Accordingly, a noise generated by a vibrating member, for example, the rearward link member 60, hitting the end portion 92 of the rear panel 13 may be reduced.

Fourthly, in the roof apparatus according to the embodiment, the side portion weather strip 21 may be retained to the guide rail 14 by inserting the vertical wall portion 15 between the pair of protrusions 25*a*, 25*b* of the fitting portion 25 at the portion to be retained 24 of the side portion weather strip 21 so that installability of the side portion weather strip 21 may be enhanced. Furthermore, by inserting the vertical wall portion 15 of the guide rail 14 between the pair of protrusions 25*a*, 25*b* of the fitting portion 25, the portion to be retained 24 hooks the first locking portion 16 and the second locking portion 17 of the vertical wall portion 15 with the first locking projection 25*c* and the second locking projection 25*d* at the protrusions 25*a*, 25*b* in a state where the side portion weather strip 21 is provided with a force that may remove the side portion weather strip 21 from the vertical wall portion 15 in the upward direction. As a result, the side portion weather strip 21 is restrained from being pulled off in the upward direction.

Fifthly, in the roof apparatus according to the embodiment, in a state where the front panel 12 makes a sliding movement, a frontward portion and a rearward portion of the front panel 12 are retained to the guide rail 14 by the frontward link member 50 and the rearward link member 60, which are provided as a pair, so that a rigidity for retaining the front panel 12 may be improved.

Sixthly, in the roof apparatus according to the embodiment, the side portion weather strip 21 is attached to the guide rail 14. Accordingly, the side portion weather strip 21 is not required to attach to a vehicle body, for example, at a portion of the roof 10. Similarly, a frontward component of the frontward-rearward portion weather strips 22 is attached to the front housing 18. Accordingly, the frontward component of the frontward-rearward portion weather strips 22 is not required to attach to a vehicle body, for example, at a portion of the roof 10. As a result, for example, a man-hour related to installing and handling the side portion weather strip 21 and the frontward-rearward portion weather strip 22 at a vehicle plant may become unnecessary. Furthermore, unlike in the case where the side portion weather strip 21 and the frontward-rearward portion weather strip 22 is attached to the roof 10 of the vehicle body by a double-faced tape, a paper waste that is peeled off from the double-faced tape is restrained from being produced.

Seventhly, in the roof apparatus according to the embodiment, providing a weather strip to a panel, for example to the rear panel 13, is not required. As a result, a resulting appearance may become pleasing because an appearance at the boundaries of the edge portion 12*a* at the end portion 91 of the front panel 12, the edge portion 12*a* that is in the vehicle width direction, and the edge portion 13*a* of the end portion 92 of the rear panel 13, the edge portion 13*a* that is in the vehicle width direction, may form a substantially straight line in the frontward-rearward direction.

The roof apparatus according to the embodiment may be altered in following manners. Favorably, portions of the guide rail 14 below the edge portion 12*a* and the edge portion 13*a* are provided with drain portions that receive water where the edge portion 12*a* is the edge portion at the end portion 91 of the front panel 12, the edge portion that is in the vehicle width direction, and the edge portion 13*a* is the edge portion at the end portion 92 of the rear panel 13, the edge portion that is in the vehicle width direction.

In a case where the front panel 12 of the roof apparatus according to the embodiment is formed by resin, the front panel 12 and the end portion 91 may be formed together from a single material. Similarly, in a case where the rear panel 13 is formed by resin, the rear panel 13 and the end portion 92 may be formed together from a single material.

In the roof apparatus according to the embodiment, the lower frontward guide surface 57 is formed on the guide 55 that is formed by resin, however, the lower frontward guide surface 57 may be directly formed out of the plate material that forms the frontward link member 50. The lower frontward guide surface 57 may protrude in a step form relative to the upper frontward guide surface 56, the step form that is protruding in an advance direction, which is in the frontward direction in a movement in the frontward direction. Similarly, the lower rearward guide surface 65 may protrude in a step form relative to the upper rearward guide surface 64, the step form that is protruding in an advance direction, which is the rearward direction in a movement in the rearward direction.

A portion of the roof apparatus according to the embodiment, the portion that makes contact with a downward portion of the side portion weather strip 21 in a state where the front panel 12 makes a sliding movement, which is either a lower frontward guide surface 57 or a lower rearward guide surface 65, may or may not protrude in an advance direction of a movement of the frontward link member 50 and the rearward link member 60 in the frontward-rearward direction.

A portion of the front guide surface 58 or the rear guide surface 66 of the roof apparatus according to the embodiment, the portion that makes contact with a downward portion of the side portion weather strip 21 in a state where the front panel 12 makes a sliding movement, may protrude in an advance direction of a movement of the frontward link member 50 and the rearward link member 60 in the frontward-rearward direction.

The upper frontward guide surface 56, the lower frontward guide surface 57, or a front guide surface 58 of the roof apparatus according to the embodiment may be formed in any form provided that the form generates a component of force that resiliently deforms the side portion weather strip 21 in the upward direction in a state where the upper frontward guide surface 56, the lower frontward guide surface 57, or the front guide surface 58 moves in the frontward-rearward direction, which is a movement that accompanies a sliding movement of the front panel 12. An alternative form of the upper frontward guide surface 56 is a slanted straight-line form. An alternative form of the lower frontward guide surface 57 or the front guide surface 58 is a curved form similar to a bow form. Similarly, the upper rearward guide surface 64, the lower rearward guide surface 65, or the rear guide surface 66 may be formed in any form provided that the form generates a component of force that resiliently deforms the side portion weather strip 21 in the upward direction in a state where the upper rearward guide surface 64, the lower rearward guide surface 65, or the rear guide surface 66 moves in the frontward-rearward direction, which is a movement that accompanies a sliding movement of the front panel 12. An alternative form of the upper rearward guide surface 64 or the lower rearward guide surface 65 may be a slanted straight-line form. An alternative form of the rear guide surface 66 is a curved form similar to a bow form.

The first flange portion 91a of the end portion 91 in the roof apparatus according to the embodiment may or may not slant in a straight line provided that the first flange portion 91a extends toward the vehicle interior direction while extending downwardly. Similarly, the second flange portion 92a of the end portion 92 may or may not slant in a straight line provided that the second flange portion 92a extends toward the vehicle exterior direction while extending downwardly.

The side portion weather strip 21 of the roof apparatus according to the embodiment is attached to a unit of a sun roof apparatus, which is the guide rail 14, however, the side portion weather strip 21 may be attached instead to the vehicle body, for example, to the edge portion 11a of the roof opening 11. Similarly, the frontward-rearward portion weather strip 22 may be attached instead to the vehicle body, for example, to the edge portion 11a of the roof opening 11.

The cross sectional shape of the side portion weather strip 21 or the frontward-rearward portion weather strip 22 of the roof apparatus according to the embodiment may be in any selected shape. The first locking projection 25c and the second locking projection 25d at the fitting portion 25 of the side portion weather strip 21 may be omitted so that the side portion weather strip 21 may be provided with a structure where the fitting portion 25 alone fits to the vertical wall portion 15. Furthermore, the fitting portion 25 of the side portion weather strip 21 may be omitted so that the portion to be retained 24 of the side portion weather strip 21 may be fixedly attached to the vertical wall portion 15 by using, for example, a double-faced tape.

An arrangement to link the driving shoe 40 with each of the frontward link member 50 and the rearward link member 60 in the roof apparatus according to the embodiment is an example and the arrangement may be altered. Alternatively, guiding grooves having upside down forms that are flipped in the frontward-rearward direction from the forms of the first groove 42 and the second groove 43 may be formed on the frontward link member 50 and the rearward link member 60 and a driving shoe 40 may be provided with a frontward engaging pin and a rearward engaging pin that fit into corresponding alternative guiding grooves.

The front panel 12 of the roof apparatus according to the embodiment may be a movable panel that makes a sliding movement while the panel is retained in a tilt-up state. The rear panel 13 of the roof apparatus according to the embodiment may be replaced with a movable panel, for example, a movable panel that makes a tilt-up movement.

According to an aspect of this disclosure, a roof apparatus includes a front panel 12 configured to open and close a frontward area of a roof opening 11 that is formed on a roof 10 of a vehicle and a rear panel covering a rearward area of the roof opening 11. The roof apparatus further includes an end portion 91 made of resin formed at a peripheral portion of the front panel and an end portion 92 made of resin formed at a peripheral portion of the rear panel 13, the end portion 91 and the end portion 92 configured to align edges of the end portion 91 and the end portion 92, the edges that are in a vehicle width direction, the edges that are viewed from a direction that looks at a design surface of the roof 10 of the vehicle. The roof apparatus furthermore includes a frontward link member 50 connected to a frontward portion of an end area in the vehicle width direction of the front panel 12 and a rearward link member 60 connected to a rearward portion of an end area in the vehicle width direction of the front panel 12, the frontward link member 50 and the rearward link member 60 configured to move the front panel 12 in an upward-downward direction relative to the roof opening 11 and configured to provide the front panel 12 with a sliding movement while retaining the front panel 12 in a state where the front panel 12 is raised in the upward direction. The roof apparatus further includes a side portion weather strip 21 making a liquid tight contact with an edge portion 12a of the front panel 12, the edge portion 12a that is in the vehicle width direction, where the front panel 12 is in a fully closed state, the side portion weather strip 21 making a liquid tight contact with an edge portion 13a of the rear panel 13, the edge portion 13a that is in the vehicle width direction, the side portion weather strip 21 arranged at a position where the frontward link member 50 and the rearward link member 60 slide thereon at a position that is outward of either the edge portion 12*a* of the front panel 12 or the edge portion 13*a* of the rear panel 13 in a state where the front panel 12 is in a sliding movement. Each of the frontward link member 50 and the rearward link member 60 includes a frontward guide surface (an upper frontward guide surface 56, a lower frontward guide surface 57, a rear guide surface 66) and a rearward guide surface (an upper rearward guide surface 64, a lower rearward guide surface 65, a front guide surface 58) generating a component of force that makes the side portion weather strip 21 to resiliently deform upwardly, frontward guide surface (the upper frontward guide surface 56, the lower frontward guide surface 57, the rear guide surface 66) and the rearward guide surface (the upper rearward guide surface 64, the lower rearward guide surface 65, the front guide surface 58) arranged at end surfaces of the frontward link member 50 and the rearward link member 60, the end surfaces that come into contact with the side portion weather strip 21 first in a state where the frontward link member 50 and the rearward link member 60 make a movement in a frontward-rearward direction, the movement that accompanies a movement of the front panel 12.

Upon the arrangement described herewith, the roof apparatus that may allow the side portion weather strip 21 to resiliently deform smoothly may be provided where the side portion weather strip 21 is a weather strip that makes liquid tight contact with the edge portion 12*a* of the front panel 12, the edge portion 12*a* that is in the vehicle width direction, and with the edge portion 13*a* of the rear panel 13, the edge portion 13*a* that is in the vehicle width direction, in a state where the front panel 12 is in a fully closed state. In a state where the front panel 12 is in the fully closed state, the side portion weather strip 21 makes liquid tight contact with each of the edge portion 12*a* at the end portion 91 of the front panel 12 and the edge portion 13*a* at the end portion 92 of the rear panel 13 so that penetration of a liquid form similar to water droplets and rain droplets may be prevented. Furthermore, in a state where the frontward link member 50 and the rearward link member 60 make a frontward-rearward movement that accompanies a sliding movement of the front panel 12, the frontward guide surface (the upper frontward guide surface 56, the lower frontward guide surface 57, the rear guide surface 66) and the rearward guide surface (the upper rearward guide surface 64, the lower rearward guide surface 65, the front guide surface 58) guide the side portion weather strip 21 to resiliently deform upwardly. Accordingly, the frontward link member 50 and the rearward link member 60 slide on the side portion weather strip 21 while making the side portion weather strip 21 to resiliently deform upwardly in a smooth manner. As a result, the side portion weather strip 21 is restrained from receiving an excessive load from the sliding movement of the front panel 12 and from repeating unstable resilient deformations that may cause duration of life of the side portion weather strip 21 to lessen.

According to another aspect of this disclosure, at least one of a frontward guide surface (an upper frontward guide surface 56, a lower frontward guide surface 57, a rear guide surface 66) and a rearward guide surface (an upper rearward guide surface 64, a lower rearward guide surface 65, a front guide surface 58) protrudes in an advance direction of a movement of the frontward link member 50 and the rearward link member 60 in the frontward-rearward direction at a portion that makes contact with a downward portion of the side portion weather strip 21 in a state where the front panel 12 makes the sliding movement.

Upon the arrangement described herewith, the frontward guide surface (the upper frontward guide surface 56, the lower frontward guide surface 57, the rear guide surface 66) and the rearward guide surface (the upper rearward guide surface 64, the lower rearward guide surface 65, the front guide surface 58) make contact first with a downward portion of the side portion weather strip 21 in a state where the frontward link member 50 and the rearward link member 60 make a movement in the frontward-rearward direction that accompanies a sliding movement of the front panel 12. Accordingly, the side portion weather strip 21 starts resilient deformation from a downward portion toward an upward portion, so that the side portion weather strip 21 resiliently deforms even more smoothly.

According to further aspect of this disclosure, a roof apparatus includes a front panel 12 configured to open and close a frontward area of a roof opening 11 that is formed on a roof 10 of a vehicle and a rear panel 13 covering a rearward area of the roof opening 11. The roof apparatus further includes an end portion 91 made of resin formed at a peripheral portion of the front panel 12 and an end portion 92 made of resin formed at a peripheral portion of the rear panel 13, the end portion 91 and the end portion 92 configured to align edges of the end portion 91 and the end portion 92, the edges that are in the vehicle width direction, the edges that are viewed from a direction that looks at a design surface of the roof 10 of the vehicle. The roof apparatus furthermore includes a frontward link member 50 connected to a frontward portion of an end area in the vehicle width direction of the front panel 12 and a rearward link member 60 connected to a rearward portion of an end area in the vehicle width direction of the front panel 12, the frontward link member 50 and the rearward link member 60 configured to move the front panel 12 in an upward-downward direction relative to the roof opening 11 and configured to provide the front panel 12 with a sliding movement while retaining the front panel 12 in a state where the front panel 12 is raised in the upward direction. The roof apparatus further includes a side portion weather strip 21 making a liquid tight contact with an edge portion 12*a* of the front panel 12, the edge portion 12*a* that is in the vehicle width direction, where the front panel 12 is in a fully closed state, the side portion weather strip 21 making a liquid tight contact with an edge portion 13*a* of the rear panel 13, the edge portion 13*a* that is in the vehicle width direction, the side portion weather strip 21 arranged at a position where the frontward link member 50 and the rearward link member 60 slide thereon at a position that is outward of either the edge portion 12*a* of the front panel 12 or the edge portion 13*a* of the rear panel 13 in a state where the front panel 12 is in a sliding movement. The end portion 91 includes a first flange portion 91*a* that extends downwardly in a vehicle height direction while slanting inwardly in the vehicle width direction. The end portion 92 includes a second flange portion 92*a* that extends downwardly in the vehicle height direction while slanting outwardly in the vehicle width direction.

Upon the arrangement described herewith, the first flange portion 91*a* at the end portion 91 of the front panel 12 extends downwardly in the vehicle height direction while slanting inwardly in the vehicle width direction. Accordingly, for example, in a case where the front panel 12 that has been raised in the upward direction relative to the roof opening 11 descends to close the roof opening 11, a slanted form of the first flange portion 91*a* guides the side portion weather strip 21 to make liquid tight contact with the edge portion 12*a* of the front panel 12, the edge portion 12*a* that is in the vehicle width direction. Accordingly, the side portion weather strip 21 may be allowed to make liquid tight contact with the edge portion 12*a* of the front panel 12, the edge portion 12*a* that is in the vehicle width direction, while making the side portion weather strip 21 to resiliently deform smoothly. As a result, the side portion weather strip 21 is restrained from receiving an excessive load from a closing movement of the front panel 12 and from repeating unstable resilient deformations that may cause duration of life of the side portion weather strip 21 to lessen. Furthermore, the second flange portion 92a at the end portion 92 of the rear panel 13 extends downwardly in the vehicle height direction while slanting outwardly in the vehicle width direction. Accordingly, for example, in a case where the rearward link member 60 or a similar member makes a sliding movement on the side portion weather strip 21 at a portion that is outward of the edge portion 13a at the end portion 92 of the rear panel 13, the edge portion 13a that is in the vehicle width direction, a slanted form of the second flange portion 92a decreases an amount of clearance in the vehicle width direction between the edge portion 13a at the end portion 92 of the rear panel 13, the edge portion 13a that is in the vehicle width direction, and the rearward link member 60 by an amount of the slanted form. Accordingly, a noise generated by the rearward link member 60 vibrating and hitting the end portion 92 of the rear panel 13 may be reduced.

According to another aspect of this disclosure, the end portion 91 of the roof apparatus includes a first flange portion 91a that extends downwardly in a vehicle height direction while slanting inwardly in the vehicle width direction. The end portion 92 of the roof apparatus according to this disclosure includes a second flange portion 92a that extends downwardly in the vehicle height direction while slanting outwardly in the vehicle width direction.

Upon the arrangement described herewith, the first flange portion 91a at the end portion 91 of the front panel 12 extends downwardly in the vehicle height direction while slanting inwardly in the vehicle width direction. Accordingly, for example, in a case where the front panel 12 that has been raised in the upward direction relative to the roof opening 11 descends to close the roof opening 11, a slanted form of the first flange portion 91a guides the side portion weather strip 21 to make liquid tight contact with the edge portion 12a of the front panel 12, the edge portion 12a that is in the vehicle width direction. Accordingly, the side portion weather strip 21 may be allowed to make liquid tight contact with the edge portion 12a of the front panel 12, the edge portion 12a that is in the vehicle width direction, while making the side portion weather strip 21 to resiliently deform smoothly. As a result, the side portion weather strip 21 is restrained from receiving an excessive load from a closing movement of the front panel 12 and from repeating unstable resilient deformations that may cause duration of life of the side portion weather strip 21 to lessen. Furthermore, the second flange portion 92a at the end portion 92 of the rear panel 13 extends downwardly in the vehicle height direction while slanting outwardly in the vehicle width direction. Accordingly, for example, in a case where the rearward link member 60 or a similar member makes a sliding movement on the side portion weather strip 21 at a portion that is outward of the edge portion 13a of the rear panel 13, the edge portion 13a that is in the vehicle width direction, a slanted form of the second flange portion 92a decreases an amount of clearance in the vehicle width direction between the edge portion 13a at the end portion 92 of the rear panel 13, the edge portion 13a that is in the vehicle width direction, and the rearward link member 60 by an amount of the slanted form. Accordingly, a noise generated by the rearward link member 60 vibrating and hitting the end portion 92 of the rear panel 13 may be reduced.

According to another aspect of this disclosure, a roof apparatus includes a front panel 12 configured to open and close a frontward area of a roof opening 11 that is formed on a roof 10 of a vehicle and a rear panel 13 covering a rearward area of the roof opening 11. The roof apparatus further includes an end portion 91 made of resin formed at a peripheral portion of the front panel 12 and an end portion 92 made of resin formed at a peripheral portion of the rear panel 13, the end portion 91 and the end portion 92 configured to align edges of the end portion 91 and the end portion 92, the edges that are in a vehicle width direction, the edges that are viewed from a direction that looks at a design surface of the roof 10 of the vehicle. The roof apparatus furthermore includes a frontward link member 50 connected to a frontward portion of an end area in the vehicle width direction of the front panel 12 and a rearward link member 60 connected to a rearward portion of an end area in the vehicle width direction of the front panel 12, the frontward link member 50 and the rearward link member 60 configured to move the front panel 12 in an upward-downward direction relative to the roof opening 11 and configured to provide the front panel 12 with a sliding movement while retaining the front panel 12 in a state where the front panel 12 is raised in the upward direction. The roof apparatus further includes a side portion weather strip 21 making a liquid tight contact with an edge portion 12a of the front panel 12, the edge portion 12a that is in the vehicle width direction, where the front panel 12 is in a fully closed state, the side portion weather strip 21 making a liquid tight contact with an edge portion 13a of the rear panel 13, the edge portion 13a that is in the vehicle width direction, the side portion weather strip 21 arranged at a position where the frontward link member 50 and the rearward link member 60 slide thereon at a position that is outward of either the edge portion 12a of the front panel 12 or the edge portion 13a of the rear panel 13 in a state where the front panel 12 is in a sliding movement. Each of the frontward link member 50 and the rearward link member 60 includes a frontward guide surface (an upper frontward guide surface 56, a lower frontward guide surface 57, a rear guide surface 66) and a rearward guide surface (an upper rearward guide surface 64, a lower rearward guide surface 65, a front guide surface 58) generating a component of force that makes the side portion weather strip 21 to resiliently deform upwardly, frontward guide surface (the upper frontward guide surface 56, the lower frontward guide surface 57, the rear guide surface 66) and the rearward guide surface (the upper rearward guide surface 64, the lower rearward guide surface 65, the front guide surface 58) arranged at end surfaces of the frontward link member 50 and the rearward link member 60, the end surfaces that come into contact with the side portion weather strip 21 first in a state where the frontward link member 50 and the rearward link member 60 make a movement in a frontward-rearward direction, the movement that accompanies a movement of the front panel 12. Furthermore, the end portion 91 includes a first flange portion 91a that extends downwardly in a vehicle height direction while slanting inwardly in the vehicle width direction, and the end portion 92 includes a second flange portion 92a that extends downwardly in the vehicle height direction while slanting outwardly in the vehicle width direction.

Upon the arrangement described herewith, the roof apparatus that may allow the side portion weather strip 21 to resiliently deform smoothly may be provided, where the side portion weather strip 21 is a weather strip that makes liquid tight contact with the edge portion 12a of the front panel 12, the edge portion 12a that is in the vehicle width direction, and with the edge portion 13a of the rear panel 13, the edge portions 13a that is in the vehicle width direction, in a state where the front panel 12 is in a fully closed state. In a state where the front panel 12 is in the fully closed state, the side portion weather strip 21 makes liquid tight contact with each of the edge portion 12a at the end portion 91 of the front panel 12 and the edge portion 13a at the end portion 92 of the rear panel 13 so that penetration of a liquid form similar to water droplets and rain droplets may be prevented. Furthermore, in a state where the frontward link member 50 and the rearward link member 60 make a frontward-rearward movement that accompanies a sliding movement of the front panel 12, the frontward guide surface (the upper frontward guide surface 56, the lower frontward guide surface 57, the rear guide surface 66) and the rearward guide surface (the upper rearward guide surface 64, the lower rearward guide surface 65, the front guide surface 58) guide the side portion weather strip 21 to resiliently deform upwardly. Accordingly, the frontward link member 50 and the rearward link member 60 slide on the side portion weather strip 21 while making the side portion weather strip 21 to resiliently deform upwardly in a smooth manner. As a result, the side portion weather strip 21 is restrained from receiving an excessive load from the sliding movement of the front panel 12 and from repeating unstable resilient deformations that may cause duration of life of the side portion weather strip 21 to lessen. Furthermore, the first flange portion 91a at the end portion 91 of the front panel 12 extends downwardly in the vehicle height direction while slanting inwardly in the vehicle width direction. Accordingly, for example, in a case where the front panel 12 that has been raised in the upward direction relative to the roof opening 11 descends to close the roof opening 11, a slanted form of the first flange portion 91a guides the side portion weather strip 21 to make liquid tight contact with the edge portion 12a of the front panel 12, the edge portion 12a that is in the vehicle width direction. Accordingly, the side portion weather strip 21 may be allowed to make liquid tight contact with the edge portion 12a of the front panel 12, the edge portion 12a that is in the vehicle width direction, while making the side portion weather strip 21 to resiliently deform smoothly. As a result, the side portion weather strip 21 is restrained from receiving an excessive load from a closing movement of the front panel 12 and from repeating unstable resilient deformations that may cause duration of life of the side portion weather strip 21 to lessen. Furthermore, the second flange portion 92a at the end portion 92 of the rear panel 13 extends downwardly in the vehicle height direction while slanting outwardly in the vehicle width direction. Accordingly, for example, in a case where the rearward link member 60 or a similar member makes a sliding movement on the side portion weather strip 21 at a portion that is outward of the edge portion 13a at the end portion 92 of the rear panel 13, the edge portion 13a that is in the vehicle width direction, a slanted form of the second flange portion 92a decreases an amount of clearance in the vehicle width direction between the edge portion 13a at the end portion 92 of the rear panel 13, the edge portion 13a that is in the vehicle width direction, and the rearward link member 60 by an amount of the slanted form. Accordingly, a noise generated by the rearward link member 60 vibrating and hitting the end portion 92 of the rear panel 13 may be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A roof apparatus, comprising:
a front panel configured to open and close a frontward area of an opening that is formed on a roof portion of a vehicle;
a rear panel covering a rearward area of the opening;
a first end portion made of resin formed at a peripheral portion of the front panel and a second end portion made of resin formed at a peripheral portion of the rear panel, the first end portion and the second end portion configured to align edges of the first end portion and the second end portion, the edges that are in a vehicle width direction, the edges that are viewed from a direction that looks at a design surface of the roof portion of the vehicle;
a frontward link member connected to a frontward portion of an end area in the vehicle width direction of the front panel and a rearward link member connected to a rearward portion of an end area in the vehicle width direction of the front panel, the frontward link member and the rearward link member configured to move the front panel in an upward-downward direction relative to the opening and configured to provide the front panel with a sliding movement while retaining the front panel in a state where the front panel is raised in the upward direction; and
a weather strip making a liquid tight contact with a first edge portion of the front panel, the first edge portion that is in the vehicle width direction, where the front panel is in a fully closed state, the weather strip making a liquid tight contact with a second edge portion of the rear panel, the second edge portion that is in the vehicle width direction, the weather strip arranged at a position where the frontward link member and the rearward link member slide thereon at a position that is outward of either the first edge portion of the front panel or the second edge portion of the rear panel in a state where the front panel is in a sliding movement, wherein
each of the frontward link member and the rearward link member includes a frontward guide surface and a rearward guide surface generating a component of force that makes the weather strip to resiliently deform upwardly, the frontward guide surface and the rearward guide surface arranged at end surfaces of the frontward link member and the rearward link member, the end surfaces that come into contact with the weather strip first in a state where the frontward link member and the rearward link member make a movement in a frontward-rearward direction, the movement that accompanies a movement of the front panel.

2. The roof apparatus according to claim 1, wherein at least one of the frontward guide surface and the rearward guide surface protrudes in an advance direction of a movement of the frontward link member and the rearward link member in the frontward-rearward direction at a portion that makes contact with a downward portion of the weather strip in a state where the front panel makes the sliding movement.

3. A roof apparatus, comprising:
a front panel configured to open and close a frontward area of an opening that is formed on a roof portion of a vehicle;
a rear panel covering a rearward area of the opening;
a first end portion made of resin formed at a peripheral portion of the front panel and a second end portion made of resin formed at a peripheral portion of the rear panel, the first end portion and the second end portion configured to align edges of the first end portion and the second end portion, the edges that are in a vehicle width direction, the edges that are viewed from a direction that looks at a design surface of the roof portion of the vehicle;

a frontward link member connected to a frontward portion of an end area in the vehicle width direction of the front panel and a rearward link member connected to a rearward portion of an end area in the vehicle width direction of the front panel, the frontward link member and the rearward link member configured to move the front panel in an upward-downward direction relative to the opening and configured to provide the front panel with a sliding movement while retaining the front panel in a state where the front panel is raised in the upward direction; and a weather strip making a liquid tight contact with a first edge portion of the front panel, the first edge portion that is in the vehicle width direction, where the front panel is in a fully closed state, the weather strip making a liquid tight contact with a second edge portion of the rear panel, the second edge portion that is in the vehicle width direction, the weather strip arranged at a position where the frontward link member and the rearward link member slide thereon at a position that is outward of either the first edge portion of the front panel or the second edge portion of the rear panel in a state where the front panel is in a sliding movement, wherein the first end portion includes a first flange portion that extends downwardly in a vehicle height direction while slanting inwardly in the vehicle width direction, and wherein the second end portion includes a second flange portion that extends downwardly in the vehicle height direction while slanting outwardly in the vehicle width direction.

4. The roof apparatus according to claim 1, wherein the first end portion includes a first flange portion that extends downwardly in a vehicle height direction while slanting inwardly in the vehicle width direction, and wherein the second end portion includes a second flange portion that extends downwardly in the vehicle height direction while slanting outwardly in the vehicle width direction.

5. The roof apparatus according to claim 2, wherein the first end portion includes a first flange portion that extends downwardly in a vehicle height direction while slanting inwardly in the vehicle width direction, and wherein the second end portion includes a second flange portion that extends downwardly in the vehicle height direction while slanting outwardly in the vehicle width direction.

6. A roof apparatus, comprising:

a front panel configured to open and close a frontward area of an opening that is formed on a roof portion of a vehicle;

a rear panel covering a rearward area of the opening;

a first end portion made of resin formed at a peripheral portion of the front panel and a second end portion made of resin formed at a peripheral portion of the rear panel, the first end portion and the second end portion configured to align edges of the first end portion and the second end portion, the edges that are in a vehicle width direction, the edges that are viewed from a direction that looks at a design surface of the roof portion of the vehicle;

a frontward link member connected to a frontward portion of an end area in the vehicle width direction of the front panel and a rearward link member connected to a rearward portion of an end area in the vehicle width direction of the front panel, the frontward link member and the rearward link member configured to move the front panel in an upward-downward direction relative to the opening and configured to provide the front panel with a sliding movement while retaining the front panel in a state where the front panel is raised in the upward direction; and a weather strip making a liquid tight contact with a first edge portion of the front panel, the first edge portion that is in the vehicle width direction, where the front panel is in a fully closed state, the weather strip making a liquid tight contact with a second edge portion of the rear panel, the second edge portion that is in the vehicle width direction, the weather strip arranged at a position where the frontward link member and the rearward link member slide thereon at a position that is outward of either the first edge portion of the front panel or the second edge portion of the rear panel in a state where the front panel is in a sliding movement, wherein each of the frontward link member and the rearward link member includes a frontward guide surface and a rearward guide surface generating a component of force that makes the weather strip to resiliently deform upwardly, the frontward guide surface and the rearward guide surface arranged at end surfaces of the frontward link member and the rearward link member, the end surfaces that comes into contact with the weather strip first in a state where the frontward link member and the rearward link member make a movement in a frontward-rearward direction, the movement that accompanies a movement of the front panel, and wherein the first end portion includes a first flange portion that extends downwardly in a vehicle height direction while slanting inwardly in the vehicle width direction, and wherein the second end portion includes a second flange portion that extends downwardly in the vehicle height direction while slanting outwardly in the vehicle width direction.

* * * * *